(12) United States Patent
Kubota

(10) Patent No.: US 9,646,575 B2
(45) Date of Patent: May 9, 2017

(54) REMOTE DESKTOP SYSTEM EVALUATING METHOD, MEDIUM AND APPARATUS

(71) Applicant: FUJITSU LIMITED, Kawasaki-shi, Kanagawa (JP)

(72) Inventor: Atsushi Kubota, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 80 days.

(21) Appl. No.: 14/635,409

(22) Filed: Mar. 2, 2015

(65) Prior Publication Data
US 2015/0255046 A1   Sep. 10, 2015

(30) Foreign Application Priority Data

Mar. 5, 2014   (JP) .................... 2014-043069

(51) Int. Cl.
*G09G 5/38* (2006.01)
*G06F 3/14* (2006.01)
*G09G 5/14* (2006.01)

(52) U.S. Cl.
CPC ............. *G09G 5/38* (2013.01); *G06F 3/1415* (2013.01); *G09G 5/14* (2013.01); *G09G 2370/022* (2013.01)

(58) Field of Classification Search
CPC ...... G09G 5/38; G09G 5/14; G09G 2370/022; G06F 3/1415
USPC ........................................................ 345/522
IPC ........................................................ G06T 1/00
See application file for complete search history.

(56) References Cited

U.S. PATENT DOCUMENTS

| 5,793,948 A | 8/1998 | Asahi et al. |
| 2001/0035869 A1* | 11/2001 | Ikeda .................... G06F 3/0488 345/619 |
| 2012/0249415 A1* | 10/2012 | Nakajima ............. G06F 1/1647 345/156 |

FOREIGN PATENT DOCUMENTS

| JP | 8-153022 | 6/1996 |
| JP | 2004-38619 | 2/2004 |
| JP | 2008-191981 | 8/2008 |

* cited by examiner

*Primary Examiner* — Ke Xiao
*Assistant Examiner* — Kim-Thanh T Tran
(74) *Attorney, Agent, or Firm* — Staas & Halsey LLP

(57) ABSTRACT

A method includes extracting an input operation data group that includes multiple items of input operation data in a remote desktop system and a drawing processing data group that includes multiple items of drawing processing data, specifying a relative position between a coordinate that is included in one item of input operation data among the extracted input operation data group, and a coordinate of a drawing area that is included in one item of drawing processing data among the extracted drawing processing data group, specifying a coordinate that is assumed to be included in any item of input operation data which is included in the input operation data group, and associating different input operation data that is included in the input operation data group, with the different drawing processing data, based on the coordinates that are assumed and that are specified.

6 Claims, 24 Drawing Sheets

FIG. 6A

| TIME INFORMATION | CLIENT INFORMATION | SERVER INFORMATION | TYPE | COMMAND | COMMAND ARGUMENT |
|---|---|---|---|---|---|
| 2013/03/18 09:00:00.000000 | 10.0.0.1:1000 | 10.0.0.2:6000 | RES | FRAME TRANSMISSION COMPLETION | NoChangeFrame=0 |
| 2013/03/18 09:00:00.015000 | 10.0.0.1:1000 | 10.0.0.2:6000 | REQ | MOUSE PRESSING | DOWNWARD CURSOR |
| 2013/03/18 09:00:00.030000 | 10.0.0.1:1000 | 10.0.0.2:6000 | RES | FRAME TRANSMISSION COMPLETION | NoChangeFrame=0 |
| 2013/03/18 09:00:00.056000 | 10.0.0.1:1000 | 10.0.0.2:6000 | RES | AREA COPY | (x=100,y=60)→(x=100,y=120,WIDTH=330,LENGTH=180) |
| 2013/03/18 09:00:00.058000 | 10.0.0.1:1000 | 10.0.0.2:6000 | RES | IMAGE DRAWING | (x=100,y=60),[IMAGE DATA 330×60] |
| 2013/03/18 09:00:00.060000 | 10.0.0.1:1000 | 10.0.0.2:6000 | RES | FRAME TRANSMISSION COMPLETION | NoChangeFrame=0 |

Columns: 21a, 21b, 21c, 21d, 21e, 21f. Arrows (S), (T), (U) point to rows.

FIG. 6B

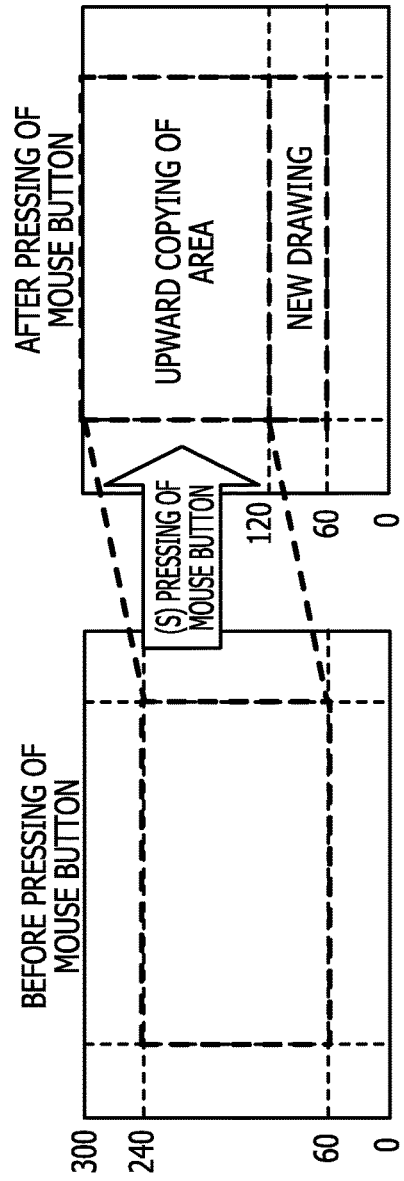

FIG. 7

| TIME INFORMATION | COORDINATES OF "MOUSE MOVE" COMMAND | |
|---|---|---|
| | X | Y |
| 2013/05/10 14:21:14.576407 | 759 | 415 |
| 2013/05/10 14:21:14.603594 | 742 | 416 |
| 2013/05/10 14:21:14.632718 | 725 | 418 |
| 2013/05/10 14:21:14.665237 | 719 | 418 |
| 2013/05/10 14:21:14.694733 | 689 | 419 |
| 2013/05/10 14:21:14.729859 | 681 | 419 |
| 2013/05/10 14:21:14.748574 | 668 | 419 |
| 2013/05/10 14:21:14.779415 | 657 | 420 |
| 2013/05/10 14:21:14.802549 | 653 | 420 |
| 2013/05/10 14:21:14.829597 | 647 | 420 |
| 2013/05/10 14:21:14.853104 | 634 | 420 |
| 2013/05/10 14:21:14.878100 | 624 | 420 |
| 2013/05/10 14:21:14.911200 | 619 | 420 |
| 2013/05/10 14:21:14.926526 | 614 | 420 |
| 2013/05/10 14:21:14.961253 | 609 | 420 |
| 2013/05/10 14:21:14.964752 | 607 | 420 |
| 2013/05/10 14:21:14.990936 | 603 | 420 |
| 2013/05/10 14:21:15.015376 | 599 | 420 |
| 2013/05/10 14:21:15.047803 | 595 | 420 |
| 2013/05/10 14:21:15.073034 | 587 | 419 |
| 2013/05/10 14:21:15.096353 | 582 | 417 |
| 2013/05/10 14:21:15.119098 | 576 | 416 |
| 2013/05/10 14:21:15.150954 | 563 | 414 |
| 2013/05/10 14:21:15.180956 | 560 | 412 |
| 2013/05/10 14:21:15.182128 | 559 | 412 |
| 2013/05/10 14:21:15.210332 | 558 | 412 |
| 2013/05/10 14:21:15.234969 | 557 | 411 |
| 2013/05/10 14:21:15.274378 | 557 | 411 |
| 2013/05/10 14:21:15.303373 | 557 | 410 |
| 2013/05/10 14:21:15.315581 | 556 | 410 |

FIG. 8

| | COORDINATES OF "AREA COPY" COMMAND | | | |
|---|---|---|---|---|
| TIME INFORMATION | COPY SOURCE X | COPY SOURCE Y | COPY DESTINATION X | COPY DESTINATION Y |
| 2013-05-10 14:21:14.601231 | 468 | 407 | 432 | 406 |
| 2013-05-10 14:21:14.664200 | 432 | 406 | 398 | 409 |
| 2013-05-10 14:21:14.710418 | 398 | 409 | 362 | 410 |
| 2013-05-10 14:21:14.761842 | 362 | 410 | 341 | 410 |
| 2013-05-10 14:21:14.806201 | 341 | 410 | 330 | 411 |
| 2013-05-10 14:21:14.838209 | 330 | 411 | 326 | 411 |
| 2013-05-10 14:21:14.897252 | 326 | 411 | 297 | 411 |
| 2013-05-10 14:21:14.944286 | 297 | 411 | 287 | 411 |
| 2013-05-10 14:21:14.990974 | 287 | 411 | 280 | 411 |
| 2013-05-10 14:21:15.035627 | 280 | 411 | 272 | 411 |
| 2013-05-10 14:21:15.103419 | 272 | 411 | 260 | 410 |
| 2013-05-10 14:21:15.162933 | 260 | 410 | 236 | 405 |
| 2013-05-10 14:21:15.196665 | 236 | 405 | 232 | 403 |
| 2013-05-10 14:21:15.256085 | 232 | 403 | 230 | 402 |
| 2013-05-10 14:21:15.351227 | 230 | 402 | 229 | 401 |

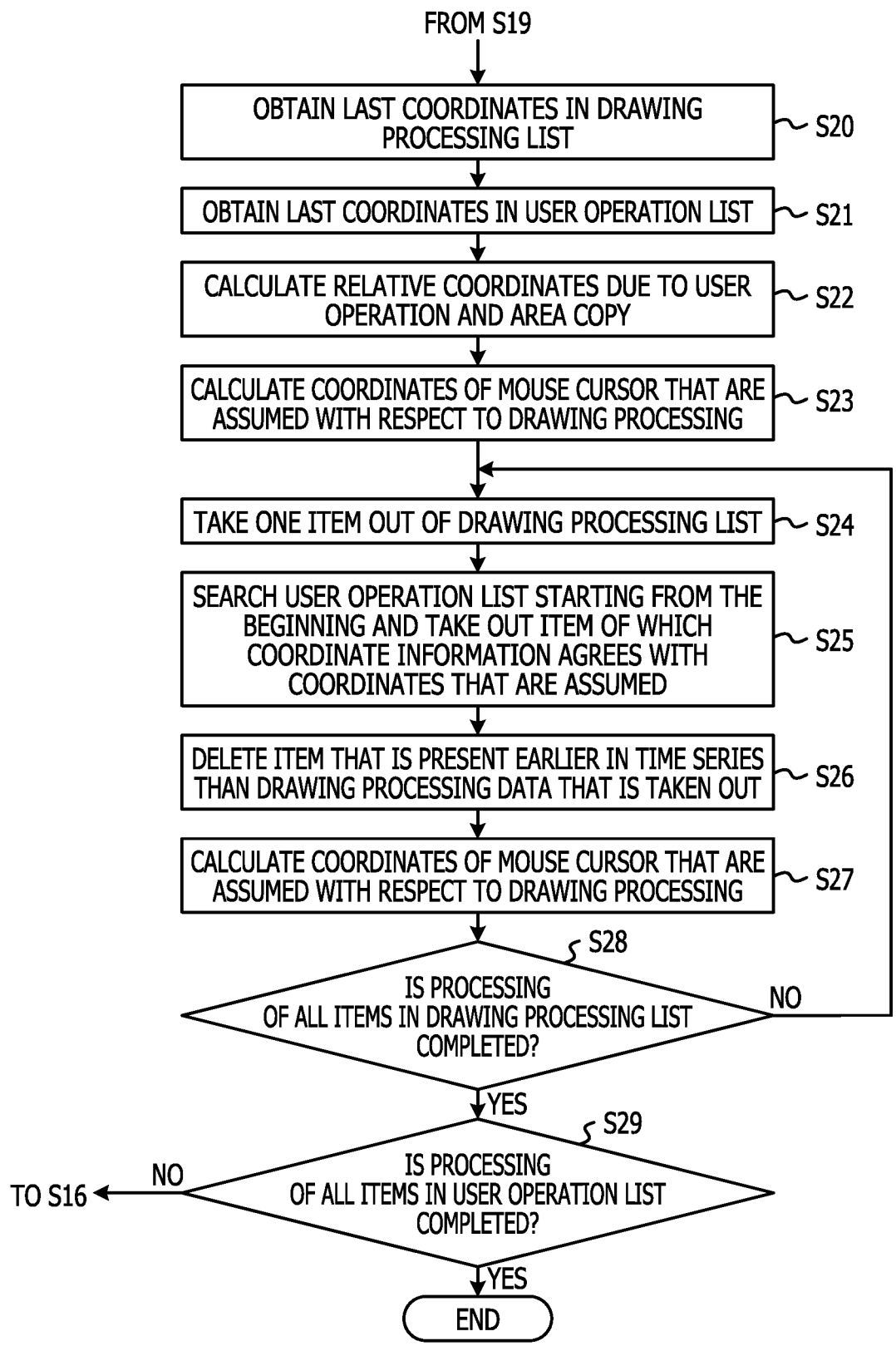

FIG. 13A

| TIME INFORMATION | CLIENT IP ADDRESS | CLIENT PORT NUMBER | SERVER IP ADDRESS | SERVER PORT NUMBER | TYPE | COMMAND | COMMAND ARGUMENT |
|---|---|---|---|---|---|---|---|
| 2013/09/05 15:08:25.689829 | 10.25.180.223 | 49331 | 10.26.94.117 | 21752 | Request | mouse move | [x=866, y=260] |
| 2013/09/05 15:08:25.697175 | 10.25.180.223 | 49331 | 10.26.94.117 | 21752 | Request | mouse button down | [btn=0] |
| 2013/09/05 15:08:25.853439 | 10.25.180.223 | 49331 | 10.26.94.117 | 21752 | Request | mouse move | [x=866, y=262] |
| 2013/09/05 15:08:25.887179 | 10.25.180.223 | 49331 | 10.26.94.117 | 21752 | Request | mouse move | [x=866, y=262] |
| 2013/09/05 15:08:25.898386 | 10.25.180.223 | 49331 | 10.26.94.117 | 21752 | Request | mouse move | [x=866, y=262] |
| 2013/09/05 15:08:25.909666 | 10.25.180.223 | 49331 | 10.26.94.117 | 21752 | Request | mouse move | [x=863, y=262] |
| 2013/09/05 15:08:25.920926 | 10.25.180.223 | 49331 | 10.26.94.117 | 21752 | Request | mouse move | [x=861, y=261] |
| 2013/09/05 15:08:25.932190 | 10.25.180.223 | 49331 | 10.26.94.117 | 21752 | Request | mouse move | [x=857, y=259] |
| 2013/09/05 15:08:25.943438 | 10.25.180.223 | 49331 | 10.26.94.117 | 21752 | Request | mouse move | [x=852, y=256] |
| 2013/09/05 15:08:25.954696 | 10.25.180.223 | 49331 | 10.26.94.117 | 21752 | Request | mouse move | [x=845, y=250] |
| 2013/09/05 15:08:25.965801 | 10.25.180.223 | 49331 | 10.26.94.117 | 21752 | Request | mouse move | [x=833, y=243] |
| 2013/09/05 15:08:25.975595 | 10.25.180.223 | 49331 | 10.26.94.117 | 21752 | Response | copy rect cmd | [x1=370, y1=250, x2=365, y2=251, x3=1274, y3=836] |
| 2013/09/05 15:08:25.977283 | 10.25.180.223 | 49331 | 10.26.94.117 | 21752 | Request | mouse move | [x=827, y=239] |
| 2013/09/05 15:08:25.987526 | 10.25.180.223 | 49331 | 10.26.94.117 | 21752 | Response | send desk picture | [codec=5CAD, x=370, y=250, w=862, h=1] |
| 2013/09/05 15:08:25.987559 | 10.25.180.223 | 49331 | 10.26.94.117 | 21752 | Response | send desk flush image | [cFlag=0x01, time=61902793.0, ncFrm=39] |
| 2013/09/05 15:08:25.990745 | 10.25.180.223 | 49331 | 10.26.94.117 | 21752 | Request | mouse move | [x=806, y=229] |
| 2013/09/05 15:08:25.999872 | 10.25.180.223 | 49331 | 10.26.94.117 | 21752 | Request | mouse move | [x=782, y=217] |
| 2013/09/05 15:08:26.010912 | 10.25.180.223 | 49331 | 10.26.94.117 | 21752 | Request | mouse move | [x=767, y=210] |
| 2013/09/05 15:08:26.022178 | 10.25.180.223 | 49331 | 10.26.94.117 | 21752 | Request | mouse move | [x=749, y=202] |
| 2013/09/05 15:08:26.023501 | 10.25.180.223 | 49331 | 10.26.94.117 | 21752 | Response | copy rect cmd | [x1=337, y1=233, x2=271, y2=200, x3=1203, y3=785] |
| 2013/09/05 15:08:26.026117 | 10.25.180.223 | 49331 | 10.26.94.117 | 21752 | Response | send desk picture | [codec=5CAD, x=1200, y=192, w=16, h=32] |
| 2013/09/05 15:08:26.026206 | 10.25.180.223 | 49331 | 10.26.94.117 | 21752 | Response | send desk flush image | [cFlag=0x01, time=61902796.9, ncFrm=0] |

FIG. 13B

| | | | | | | |
|---|---|---|---|---|---|---|
| 2013/09/05 15:08:26.933451 | 10.25.180.223 | 49331 | 10.26.94.117 | 21752 | Request | mouse move | [x=511, y=27] |
| 2013/09/05 15:08:26.964975 | 10.25.180.223 | 49331 | 10.26.94.117 | 21752 | Response | copy rect cmd | [x1=15, y1=18, x2=15, y2=17, x3=947, y3=602] |
| 2013/09/05 15:08:26.966724 | 10.25.180.223 | 49331 | 10.26.94.117 | 21752 | Response | send desk picture | [codec=5:0AD, x=0, y=592, w=960, h=16] |
| 2013/09/05 15:08:26.966826 | 10.25.180.223 | 49331 | 10.26.94.117 | 21752 | Response | send desk flush image | [cfFlag=0x01, time=619026910, ncFrm=0] |
| 2013/09/05 15:08:27.124690 | 10.25.180.223 | 49331 | 10.26.94.117 | 21752 | Request | mouse move | [x=510, y=26] |
| 2013/09/05 15:08:27.135868 | 10.25.180.223 | 49331 | 10.26.94.117 | 21752 | Request | mouse move | [x=510, y=24] |
| 2013/09/05 15:08:27.147106 | 10.25.180.223 | 49331 | 10.26.94.117 | 21752 | Request | mouse move | [x=509, y=23] |
| 2013/09/05 15:08:27.158395 | 10.25.180.223 | 49331 | 10.26.94.117 | 21752 | Request | mouse move | [x=508, y=22] |
| 2013/09/05 15:08:27.164104 | 10.25.180.223 | 49331 | 10.26.94.117 | 21752 | Response | copy rect cmd | [x1=15, y1=17, x2=12, y2=12, x3=944, y3=597] |
| 2013/09/05 15:08:27.166686 | 10.25.180.223 | 49331 | 10.26.94.117 | 21752 | Response | send desk picture | [codec=5:0AD, x=944, y=0, w=16, h=592] |
| 2013/09/05 15:08:27.166662 | 10.25.180.223 | 49331 | 10.26.94.117 | 21752 | Response | send desk flush image | [cfFlag=0x01, time=619029110, ncFrm=2] |
| 2013/09/05 15:08:27.169694 | 10.25.180.223 | 49331 | 10.26.94.117 | 21752 | Request | mouse move | [x=507, y=20] |
| 2013/09/05 15:08:27.180896 | 10.25.180.223 | 49331 | 10.26.94.117 | 21752 | Request | mouse move | [x=507, y=20] |
| 2013/09/05 15:08:27.192158 | 10.25.180.223 | 49331 | 10.26.94.117 | 21752 | Request | mouse move | [x=507, y=19] |
| 2013/09/05 15:08:27.203418 | 10.25.180.223 | 49331 | 10.26.94.117 | 21752 | Request | mouse move | [x=506, y=18] |
| 2013/09/05 15:08:27.208700 | 10.25.180.223 | 49331 | 10.26.94.117 | 21752 | Response | copy rect cmd | [x1=12, y1=12, x2=10, y2=8, x3=942, y3=593] |
| 2013/09/05 15:08:27.211892 | 10.25.180.223 | 49331 | 10.26.94.117 | 21752 | Response | send desk picture | [codec=5:0AD, x=928, y=0, w=32, h=592] |
| 2013/09/05 15:08:27.211961 | 10.25.180.223 | 49331 | 10.26.94.117 | 21752 | Response | send desk flush image | [cfFlag=0x01, time=619029155, ncFrm=0] |
| 2013/09/05 15:08:27.168760 | 10.25.180.223 | 49331 | 10.26.94.117 | 21752 | Request | mouse button up | [btn=0] |
| 2013/09/05 15:08:27.732462 | 10.25.180.223 | 49331 | 10.26.94.117 | 21752 | Request | mouse move | [x=506, y=18] |
| 2013/09/05 15:08:27.743547 | 10.25.180.223 | 49331 | 10.26.94.117 | 21752 | Request | mouse move | [x=506, y=18] |

FIG. 17A

| TIME INFORMATION | CLIENT IP ADDRESS | CLIENT PORT NUMBER | SERVER IP ADDRESS | SERVER PORT NUMBER | TYPE | COMMAND | COMMAND ARGUMENT |
|---|---|---|---|---|---|---|---|
| 2013/09/05 15:08:25.689829 | 10.25.180.223 | 49331 | 10.26.94.117 | 21752 | Request | mouse move | [x=866, y=260] |
| 2013/09/05 15:08:25.697175 | 10.25.180.223 | 49331 | 10.26.94.117 | 21752 | Request | mouse button down | [btn=0] |
| 2013/09/05 15:08:25.853439 | 10.25.180.223 | 49331 | 10.26.94.117 | 21752 | Request | mouse move | [x=866, y=262] |
| 2013/09/05 15:08:25.887179 | 10.25.180.223 | 49331 | 10.26.94.117 | 21752 | Request | mouse move | [x=866, y=262] |
| 2013/09/05 15:08:25.898386 | 10.25.180.223 | 49331 | 10.26.94.117 | 21752 | Request | mouse move | [x=866, y=262] |
| 2013/09/05 15:08:25.909666 | 10.25.180.223 | 49331 | 10.26.94.117 | 21752 | Request | mouse move | [x=863, y=261] |
| 2013/09/05 15:08:25.920926 | 10.25.180.223 | 49331 | 10.26.94.117 | 21752 | Request | mouse move | [x=861, y=259] |
| 2013/09/05 15:08:25.932190 | 10.25.180.223 | 49331 | 10.26.94.117 | 21752 | Request | mouse move | [x=857, y=256] |
| 2013/09/05 15:08:25.943438 | 10.25.180.223 | 49331 | 10.26.94.117 | 21752 | Request | mouse move | [x=852, y=250] |
| 2013/09/05 15:08:25.954696 | 10.25.180.223 | 49331 | 10.26.94.117 | 21752 | Request | mouse move | [x=845, y=247] |
| 2013/09/05 15:08:25.965881 | 10.25.180.223 | 49331 | 10.26.94.117 | 21752 | Request | mouse move | [x=833, y=243] |
| 2013/09/05 15:08:25.977263 | 10.25.180.223 | 49331 | 10.26.94.117 | 21752 | Response | copy rect cmd | [x1=370, y1=250, x2=365, y2=365, x3=1274, y3=836] |
| 2013/09/05 15:08:25.987526 | 10.25.180.223 | 49331 | 10.26.94.117 | 21752 | Request | mouse move | [x=827, y=239] |
| 2013/09/05 15:08:25.987559 | 10.25.180.223 | 49331 | 10.26.94.117 | 21752 | Response | send desk picture | [codec=5:C4D, x=370, y=250, w=862, h=1] |
| ... | | | | | | | |
| 2013/09/05 15:08:26.022178 | 10.25.180.223 | 49331 | 10.26.94.117 | 21752 | Response | send desk flush image | [cFlag=0x01, time=61902.7930, ncFrm=39] |
| 2013/09/05 15:08:26.022501 | 10.25.180.223 | 49331 | 10.26.94.117 | 21752 | Request | mouse move | [x=206, y=18] |
| 2013/09/05 15:08:26.026206 | 10.25.180.223 | 49331 | 10.26.94.117 | 21752 | Response | copy rect cmd | [x1=12, y1=12, x2=0, y2=8, x3=642, y3=593] |
| 2013/09/05 15:08:26.026206 | 10.25.180.223 | 49331 | 10.26.94.117 | 21752 | Response | send desk flush image | [cFlag=0x01, time=61902.7969, ncFrm=0] |

DIFFERENCE (last three rows)

| | | | | | | | |
|---|---|---|---|---|---|---|---|
| 2013/09/05 15:08:26.933451 | 10.25.180.223 | 49331 | 10.26.94.117 | 21752 | Request | mouse move | [x=511, y=27] |
| 2013/09/05 15:08:26.964075 | 10.25.180.223 | 49331 | 10.26.94.117 | 21752 | Response | copy rect cmd | [x1=15, y1=18, x2=15, y2=17, x3=947, y3=802] |
| 2013/09/05 15:08:26.966724 | 10.25.180.223 | 49331 | 10.26.94.117 | 21752 | Response | send desk picture | [codec=0xCA0, x=0, y=592, w=960, h=16] |
| 2013/09/05 15:08:26.966826 | 10.25.180.223 | 49331 | 10.26.94.117 | 21752 | Response | send desk flush image | [cFlag=0x01, time=619028910, ncFrm=0] |
| 2013/09/05 15:08:27.124080 | 10.25.180.223 | 49331 | 10.26.94.117 | 21752 | Request | mouse move | [x=510, y=26] |
| 2013/09/05 15:08:27.135868 | 10.25.180.223 | 49331 | 10.26.94.117 | 21752 | Request | mouse move | [x=510, y=24] |
| 2013/09/05 15:08:27.147106 | 10.25.180.223 | 49331 | 10.26.94.117 | 21752 | Request | mouse move | [x=508, y=23] |
| 2013/09/05 15:08:27.158395 | 10.25.180.223 | 49331 | 10.26.94.117 | 21752 | Request | mouse move | [x=508, y=22] |
| 2013/09/05 15:08:27.164104 | 10.25.180.223 | 49331 | 10.26.94.117 | 21752 | Response | copy rect cmd | [x1=15, y1=17, x2=12, y2=12, x3=944, y3=597] |
| 2013/09/05 15:08:27.166286 | 10.25.180.223 | 49331 | 10.26.94.117 | 21752 | Response | send desk picture | [codec=0xCA0, x=944, y=0, w=16, h=592] |
| 2013/09/05 15:08:27.166662 | 10.25.180.223 | 49331 | 10.26.94.117 | 21752 | Response | send desk flush image | [cFlag=0x01, time=619029110, ncFrm=2] |
| 2013/09/05 15:08:27.169694 | 10.25.180.223 | 49331 | 10.26.94.117 | 21752 | Request | mouse move | [x=507, y=20] |
| 2013/09/05 15:08:27.180686 | 10.25.180.223 | 49331 | 10.26.94.117 | 21752 | Request | mouse move | [x=507, y=20] |
| 2013/09/05 15:08:27.192158 | 10.25.180.223 | 49331 | 10.26.94.117 | 21752 | Request | mouse move | [x=507, y=19] |
| 2013/09/05 15:08:27.203418 | 10.25.180.223 | 49331 | 10.26.94.117 | 21752 | Request | mouse move | [x=506, y=18] |
| 2013/09/05 15:08:27.208700 | 10.25.180.223 | 49331 | 10.26.94.117 | 21752 | Response | copy rect cmd | [x1=12, y1=12, x2=10, y2=8, x3=942, y3=593] |
| 2013/09/05 15:08:27.211892 | 10.25.180.223 | 49331 | 10.26.94.117 | 21752 | Response | send desk picture | [codec=0xCA0, x=928, y=0, w=32, h=592] |
| 2013/09/05 15:08:27.211981 | 10.25.180.223 | 49331 | 10.26.94.117 | 21752 | Response | send desk flush image | [cFlag=0x01, time=619029155, ncFrm=0] |
| 2013/09/05 15:08:27.687160 | 10.25.180.223 | 49331 | 10.26.94.117 | 21752 | Request | mouse button up | [btn=0] |
| 2013/09/05 15:08:27.732462 | 10.25.180.223 | 49331 | 10.26.94.117 | 21752 | Request | mouse move | [x=506, y=18] |
| 2013/09/05 15:08:27.743347 | 10.25.180.223 | 49331 | 10.26.94.117 | 21752 | Request | mouse move | [x=506, y=18] |

FIG. 19

| OPERATION TYPE | OPERATION TIME | DRAWING TYPE | DRAWING TIME | RESPONSE TIME |
|---|---|---|---|---|
| mouse move | 2013/09/05 15:08:25.920926 | copy rect cmd | 2013/09/05 15:08:25.987559 | 0.066633 |
| mouse move | 2013/09/05 15:08:26.010912 | copy rect cmd | 2013/09/05 15:08:26.026206 | 0.015294 |
| mouse move | 2013/09/05 15:08:26.055918 | copy rect cmd | 2013/09/05 15:08:26.073726 | 0.017808 |
| mouse move | 2013/09/05 15:08:26.112170 | copy rect cmd | 2013/09/05 15:08:26.123510 | 0.011340 |
| mouse move | 2013/09/05 15:08:26.168434 | copy rect cmd | 2013/09/05 15:08:26.176956 | 0.008522 |
| mouse move | 2013/09/05 15:08:26.213385 | copy rect cmd | 2013/09/05 15:08:26.221861 | 0.008476 |
| mouse move | 2013/09/05 15:08:26.258418 | copy rect cmd | 2013/09/05 15:08:26.267067 | 0.008649 |
| mouse move | 2013/09/05 15:08:26.314698 | copy rect cmd | 2013/09/05 15:08:26.323766 | 0.009068 |
| mouse move | 2013/09/05 15:08:26.348417 | copy rect cmd | 2013/09/05 15:08:26.358808 | 0.010391 |
| mouse move | 2013/09/05 15:08:26.415903 | copy rect cmd | 2013/09/05 15:08:26.425167 | 0.009264 |
| mouse move | 2013/09/05 15:08:26.460949 | copy rect cmd | 2013/09/05 15:08:26.470308 | 0.009359 |
| mouse move | 2013/09/05 15:08:26.517187 | copy rect cmd | 2013/09/05 15:08:26.527140 | 0.009953 |
| mouse move | 2013/09/05 15:08:26.573409 | copy rect cmd | 2013/09/05 15:08:26.582441 | 0.009032 |
| mouse move | 2013/09/05 15:08:26.607184 | copy rect cmd | 2013/09/05 15:08:26.615606 | 0.008422 |
| mouse move | 2013/09/05 15:08:26.652162 | copy rect cmd | 2013/09/05 15:08:26.660018 | 0.007856 |
| mouse move | 2013/09/05 15:08:26.719663 | copy rect cmd | 2013/09/05 15:08:26.728939 | 0.009276 |
| mouse move | 2013/09/05 15:08:26.764666 | copy rect cmd | 2013/09/05 15:08:26.789863 | 0.025197 |
| mouse move | 2013/09/05 15:08:26.832160 | copy rect cmd | 2013/09/05 15:08:26.865930 | 0.033770 |
| mouse move | 2013/09/05 15:08:26.899647 | copy rect cmd | 2013/09/05 15:08:26.915306 | 0.015659 |
| mouse move | 2013/09/05 15:08:26.933451 | copy rect cmd | 2013/09/05 15:08:26.966826 | 0.033375 |
| mouse move | 2013/09/05 15:08:27.158395 | copy rect cmd | 2013/09/05 15:08:27.166662 | 0.008267 |
| mouse move | 2013/09/05 15:08:27.203418 | copy rect cmd | 2013/09/05 15:08:27.211981 | 0.008563 |

REMOTE DESKTOP SYSTEM EVALUATING METHOD, MEDIUM AND APPARATUS

CROSS-REFERENCE TO RELATED APPLICATION

This application is based upon and claims the benefit of priority of the prior Japanese Patent Application No. 2014-043069, filed on Mar. 5, 2014, the entire contents of which are incorporated herein by reference.

FIELD

The embodiments discussed herein are related to a method, a medium, and an apparatus.

BACKGROUND

A method of evaluating the performance or quality of a conversation system that has a graphical user interface (GUI) is proposed (for example, refer to Japanese Laid-open Patent Publication Nos. 8-153022, 2008-191981, and 2004-38619). As one example of the conversation system, a remote desktop system is mentioned that operates a GUI of a server from a client apparatus and provides a screen generated by the server performing drawing processing to the client apparatus. In order to evaluate the performance or quality of the remote desktop system, a response time from when an operation such as moving of a mouse by a user is performed to when the screen is provided may be measured. As the response time becomes shorter, user-experience quality of the remote desktop system may be evaluated to be improved.

SUMMARY

According to an aspect of the invention, a method includes extracting an input operation data group that includes multiple items of input operation data in a remote desktop system and a drawing processing data group that includes multiple items of drawing processing data, specifying a relative position between a coordinate that is included in one item of input operation data among the extracted input operation data group, and a coordinate of a drawing area that is included in one item of drawing processing data among the extracted drawing processing data group, specifying a coordinate that is assumed to be included in any item of input operation data which is included in the input operation data group, and associating different input operation data that is included in the input operation data group, with the different drawing processing data, based on the coordinates that are assumed and that are specified.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A and 6B are diagrams illustrating one example of information that is stored in an operation log table according to one embodiment;

FIG. 7 is a diagram illustrating one example of information that is stored in a user operation table according to one embodiment;

FIG. 8 is a diagram illustrating one example of information that is stored in a drawing processing table according to one embodiment;

FIGS. 12A and 12B are flowcharts illustrating associating processing according to a first embodiment;

FIGS. 13A and 13B are diagrams illustrating one example of information that is stored in an operation log table according to the first embodiment;

FIGS. 17A and 17B are diagrams illustrating one example of the information that is stored in the operation log table according to the second embodiment;

FIG. 19 is a diagram illustrating one example of information that is stored in a response time table according to one embodiment.

DESCRIPTION OF EMBODIMENTS

Figure 1:
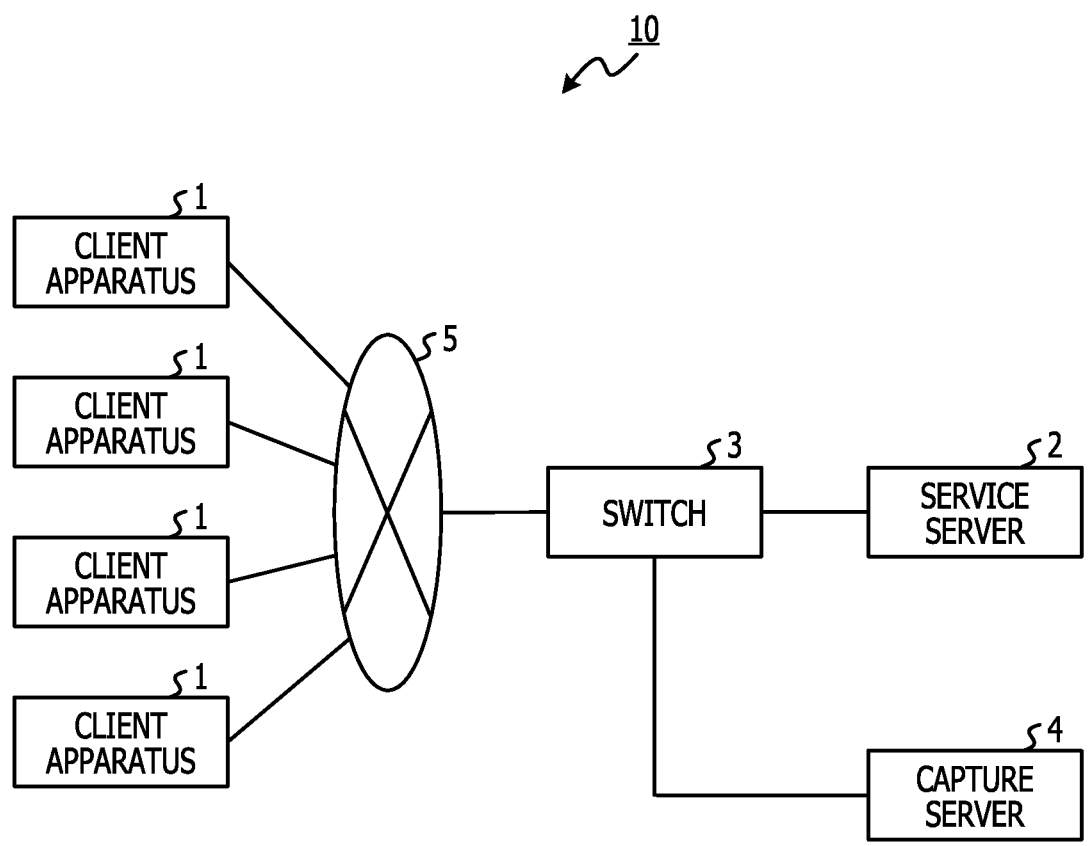
FIG. 1 is a diagram illustrating a configuration example of a remote desktop system according to one embodiment.

First, considerations by the inventor are described. In a remote desktop system, if drawing processing corresponds one-to-one to an input operation in accordance with a user's screen operation, a response time may be calculated with precision based on the time taken for transmission of input operation data and the time taken for reception of drawing processing data, and thus system quality may be correctly evaluated.

However, correspondence between the input operation and the drawing processing is not necessarily limited to one-to-one correspondence. Thus, although the input operation data and the drawing processing data are made to correspond simply to each other to calculate the response time, it is difficult to correctly evaluate the system quality, because the response time may not be calculated with precision.

According to an embodiment described below, in the remote desktop system, the drawing processing is identified as corresponding to the input operation in accordance with a screen operation.

Embodiments of the present disclosure are described below referring to the accompanying drawings. Moreover, in the present specification and in the drawings, constituent elements that have substantially the same function and structure are given like reference numerals, and redundant descriptions are not repeated.

[Remote Desktop System]

Figure 2:
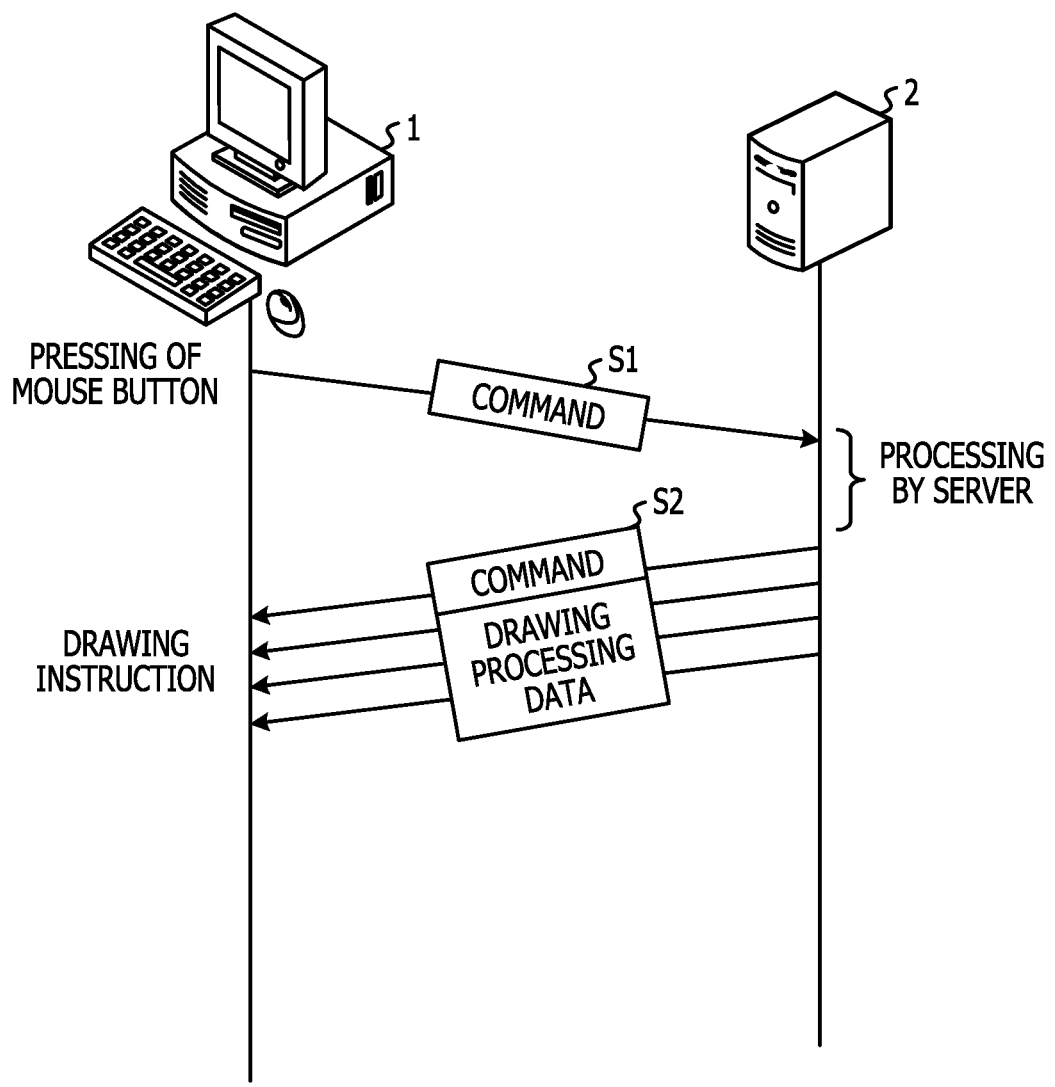
FIG. 2 is a diagram illustrating an operational example of the remote desktop system according to one embodiment.

First, the remote desktop system according to one embodiment of the present disclosure is briefly described referring to FIGS. 1 and 2. FIG. 1 illustrates a configuration example of the remote desktop system according to one embodiment. FIG. 2 illustrates an operational example of the remote desktop system according to one embodiment.

A remote desktop system 10 according to the present embodiment includes a client apparatus 1, a service server 2, a switch 3, and a capture server 4. The client apparatus 1 and the service server 2 are connected to each other through a network 5. The capture server 4 is an apparatus that may obtain data that is transmitted and received between the client apparatus 1 and the service server 2 through the switch 3.

For example, included in the remote desktop system 10 is a system called a thin client system, in which the service server 2 performs generation of a desktop screen and provides the generated desktop screen to the client apparatus 1.

Moreover, in the system according to the present embodiment, multiple client apparatuses 1 are present, but a single client apparatus may be present. Furthermore, in the system according to the present embodiment, the single service server 2 and the single capture server 4 are present, but multiple service servers 2 and multiple capture servers 4 may be provided. If multiple service servers 2 and multiple capture servers 4 are present, distributed processing is possible among the multiple service servers 2 and among the multiple capture servers 4.

The client apparatus 1 and the service server 2 repeat a sequence of processing tasks as illustrated in FIG. 2. First, the client apparatus 1 transmits an input operation command corresponding to operation of an input device by a user (hereinafter referred to as a "user operation") such as a mouse to the service server 2 (Step S1). The input operation data indicating information relating to the input is included in the input operation command.

The "user operation" is an operation by the user, such as pressing of a mouse button, moving of the mouse button, or typing input. The client apparatus 1 transmits the input operation command in accordance with the user operation to the service server 2, independently of a screen update.

The service server 2 performs processing corresponding to the received input operation command. The service server 2 replies to the client apparatus 1 with a drawing processing command (Step S2). Screen drawing processing data generated by the drawing processing by the service server 2 is included in the drawing processing command. Moreover, as one example of the drawing processing by the service server 2, for example, various drawing process tasks, such as displaying of characters in accordance with typing input, moving of a pointer by a mouse moving operation, and scrolling of a screen, that are performed by a computer in accordance with the input operation may be mentioned.

The client apparatus 1 updates a display screen based on the drawing processing data received from the service server 2. By doing this, the user may visually recognize a result of the user operation from a display on the screen.

Under a remote desktop environment, because the "input operation data" is transmitted from the client apparatus 1, the shorter the time the client apparatus 1 takes to receive the "drawing processing data," the better the quality perceived by the user. In the present system, the switch 3 and the capture server 4 are included in order to obtain in chronological order the input operation data and the drawing processing data that are transmitted and received between the client apparatus 1 and the service server 2.

The switch 3 has a port mirroring function as well as a normal switching function. The switch 3 performs port mirroring on the input operation data that is transmitted from the client apparatus 1 to the service server 2 and on the drawing processing data with which the service server 2 replies to the client apparatus 1 with respect to the capture server 4.

The capture server 4 captures and thus obtains the input operation data and the drawing processing data on which the port mirroring is performed by the switch 3. Then, the capture server 4 calculates the response time from when the input operation is transmitted from the client apparatus 1 to when the drawing processing data generated in accordance to the input operation is sent, as a response, to the client apparatus 1, using the captured input operation data and drawing processing data.

(One Example of Data that is Transmitted and Received between the Client Apparatus and the Service Server)

Figure 3:
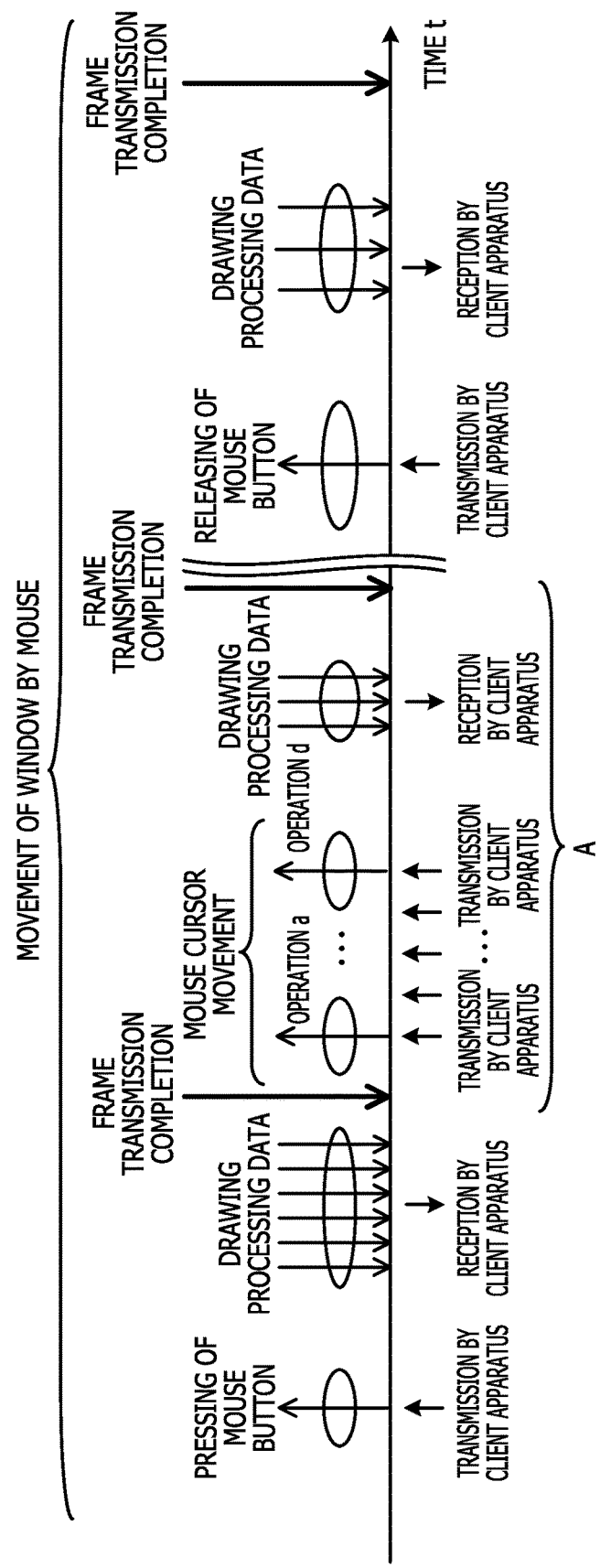
FIG. 3 is a diagram illustrating an example of data that is transmitted and received between a client apparatus and a service server.

One example of data that is transmitted and received between the client apparatus 1 and the service server 2 is described in detail referring to FIG. 3. In an example in FIG. 3, a upward arrow indicates data that is transmitted from the client apparatus 1 to the service server 2. The data that is transmitted from the client apparatus 1 to the service server 2 includes the input operation data.

On the other hand, a downward arrow indicates data that is transmitted from the service server 2 to the client apparatus 1. The data that is transmitted from the service server 2 to the client apparatus 1 includes the drawing processing data. Furthermore, if the drawing processing involves drawing of a new screen, the drawing processing data includes screen data that is a drawing target. Here, a frame transmission completion command indicates that transmission of the drawing processing data for displaying an image for one frame is completed. In other words, the drawing processing data that is transmitted between one frame transmission completion command and the following frame transmission completion command is equivalent to the drawing processing data for displaying an image for one frame.

As a rule, when the update does not occur in a screen that is displayed in the client apparatus 1, the service server 2 does not transmit frame transmission completion command data. For example, as illustrated in FIG. 3, if the user performs an operation of moving a window with the mouse, the "drawing processing data" corresponds one-to-one to the input operation data from the client apparatus 1 in accordance with the user operation, that is, the "pressing and releasing of the mouse button." On the other hand, with communication data indicated by A, the "drawing processing data" is transmitted only one time with respect to multiple items of input operation data in accordance with a change in multiple coordinates indicating the user operation that is "a movement of a mouse cursor."

To sum up, with positional information on the cursor that depends on a mouse operation, in most cases, the client apparatus 1 notifies the service server 2 of the input operation data with respect to the user operation in significant detail. As a result, the capture server 4 obtains a greater amount of the input operation data than the drawing processing data, based on the user operation in an operation such as one of moving the window using the mouse.

Figure 4A:
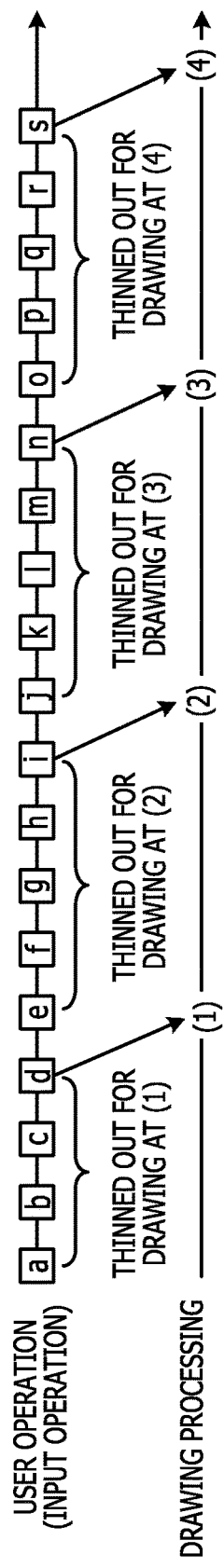
FIGS. 4A and 4B are diagrams illustrating an example in which drawing processing is performed in response to an input operation.

In this manner, under the remote desktop environment, in some cases, multiple input operations are thinned out, and thus are combined into a single drawing processing. FIG. 4A illustrates an example in which the thinned-out drawing processing tasks are performed in response to multiple input operations. For example, in user operations a to d, the drawing processing in response to the input operation in accordance with each of the user operations is not performed for the drawing, and a single drawing process is combinedly performed for the drawing at a point in time (1). In the same manner, in user operations e to i, user operations j to n, and user operations o to s, three single drawing processing tasks are combinedly performed for points in time (2), (3), and (4), respectively.

In addition, under the remote desktop environment, the drawing processing with respect to the user operation is somewhat delayed. Thus, it is desired to secure room for a part at the end of the drawing processing for extraction in response to the user operation. Generally, a limit value of a waiting time for a response with respect to an interactive input operation is said to be 150 milliseconds, and it may be considered that this may be used as a shortest-time value of a time $\alpha$. Furthermore, if the purpose is to detect abnormality, it may be considered that a value of several seconds is appropriate.

Figure 4B:
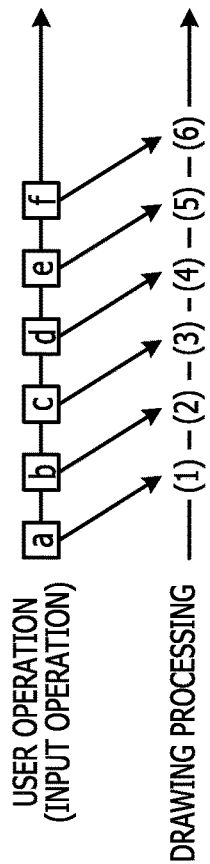

Moreover, if a delay due to a network occurs, it is desired to extend further the part at the end of the drawing processing in accordance with a delay time that occurs, independently of the above-described waiting time as a reference. FIG. 4B illustrates a relationship in time series between the user operation and the drawing processing. As described according to the present embodiment, under the remote desktop environment, the input operation data in accordance with the user operation is sent to the service server 2 through the network 5. After the drawing processing, the service server 2 transmits the drawing processing data that is a result of the processing to the client apparatus 1 through the network 5. Thus, the delay time due to data communication is invariably included in the response time. In an example in FIG. 4B, the obtaining of the drawing processing data with respect to the user operation a is performed at a timing illustrated in (1) due to the above-described delay. At the timing in (1), the next user operation b is performed. The processing is hereinafter described as being performed under a condition that the user operation b is performed at a timing illustrated in (2) and a user operation c is performed at a timing illustrated in (3).

As described above, under the remote desktop environment, the input operation data and the drawing processing data are not invariably transmitted and received in one-to-one correspondence. Furthermore, in terms of characteristics, specific drawing processing data is not invariably sent as a response to the same input operation data. Thus, although the input operation data and the drawing processing data are made to correspond simply to each other to calculate the response time, it is difficult to correctly evaluate the system quality without the response time being calculated with precision.

Accordingly, it is possible for the capture server 4 to identify the drawing processing data that corresponds to one item of input operation data among a group of items of drawing processing data that the client apparatus 1 receives from the service server 2.

Associating of the input operation data with the drawing processing data, which is performed by the capture server 4, according to one embodiment, is described below. Moreover, the capture server 4 is one example of an associating apparatus that performs the associating of the input operation data with the drawing processing data. As other examples of the associating apparatus, other servers may be mentioned that may obtain data from the capture server 4. To sum up, the associating apparatus may be built into the system, in any form, as long as the associating apparatus is an apparatus that may obtain the data that is transmitted and received between the client apparatus 1 and the service server 2.

Furthermore, in the present specification, as one example of the user operation, a "movement of the window" due to a "mouse move" is described. However, in an associating method according to the present embodiment, the user operation is not limited to the movement of the window.

[Functional Configuration of the Capture Server]

Figure 5:
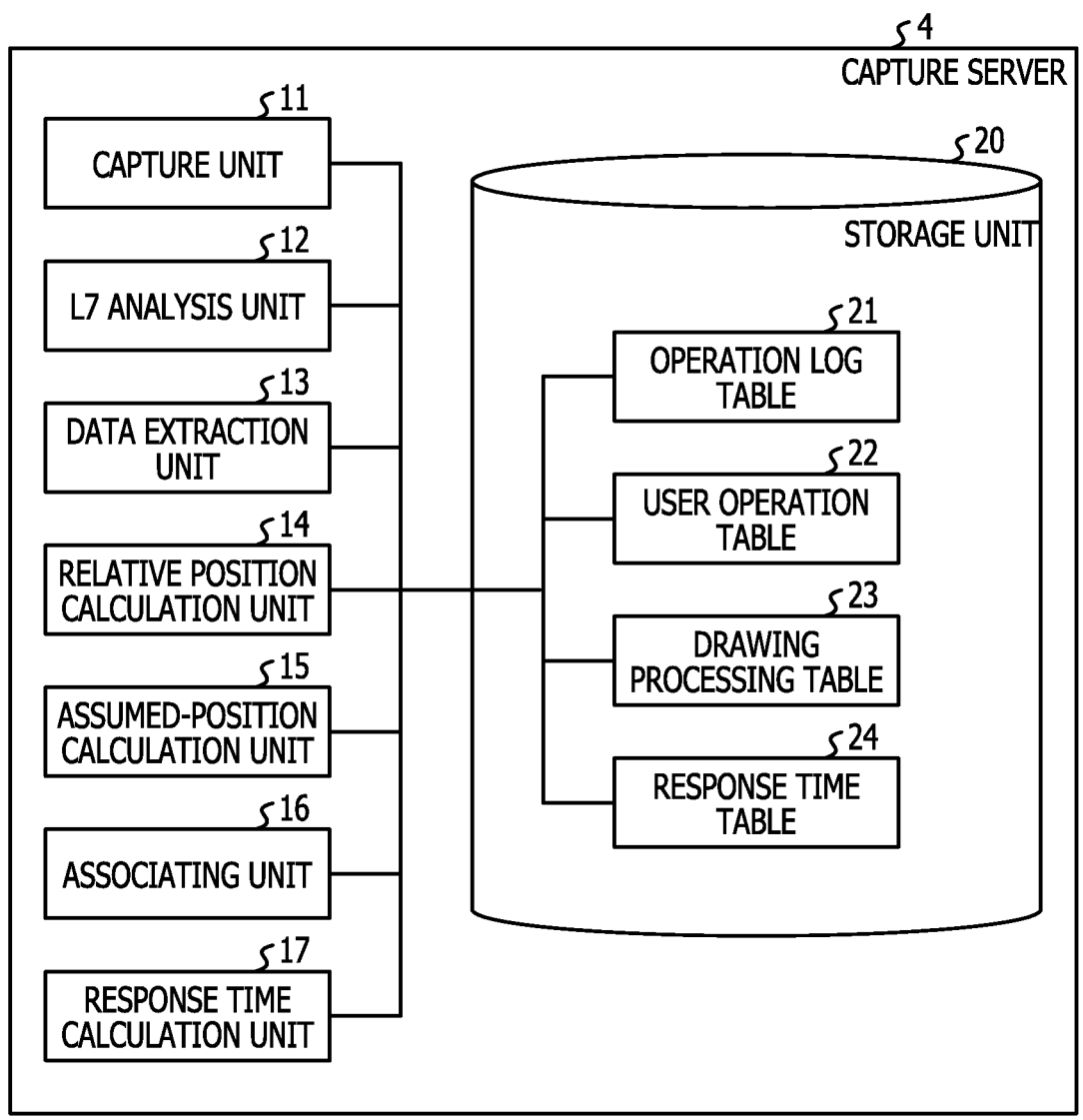
FIG. 5 is a diagram illustrating a functional configuration example of a capture server according to one embodiment.

Next, one example of a functional configuration of the capture server 4 according to one embodiment is described referring to FIG. 5. FIG. 5 illustrates one example of the functional configuration of the capture server 4 according to one embodiment. The capture server 4 includes a capture unit 11, an L7 analysis unit 12, a data extraction unit 13, an assumed-position calculation unit 14, an assumed-position calculation unit 15, an associating unit 16, a response time calculation unit 17, and a storage unit 20. Furthermore, an operation log table 21, a user operation table 22, a drawing processing table 23, and the response time table 24 are stored in a storage unit 20 of the capture server 4.

The capture unit 11 obtains the input operation data transmitted by the client apparatus 1 and the drawing processing data transmitted from the service server 2, on which the port mirroring is performed by the switch 3. At this time, the input operation data and the drawing processing data are binary data.

The L7 analysis unit 12 analyzes the input operation data and the drawing processing data obtained by the capture unit 11, converts these items of data, generates an operation log indicating contents of each of the input operation data and the drawing processing data, and writes the generated operation log to the operation log table 21.

Moreover, the capture unit 11 and the L7 analysis unit 12 are equivalent to data obtaining units that obtain and analyze the input operation data and the drawing processing data. The input operation data includes coordinates on the screen, which are in accordance with the user operation. Furthermore, the drawing processing data includes coordinates of a drawing area on which the drawing processing is performed by the service server 2 in accordance with the input operation data.

The data extraction unit 13 extracts an input operation data group and a drawing processing data group that correspond to a predetermined period of time, from the items of data written to the operation log table 21. An example of the predetermined period of time is a time that is obtained by adding the time $\alpha$ to a period of time from when the mouse button is pressed to move the cursor and to which the mouse button is released. As one example of the time $\alpha$, the delay time in obtaining data between the client apparatus 1 and the service server 2 may be mentioned, such as the time taken by the service server 2 to perform the drawing processing, or the time taken by the service server 2 to transfer the input operation data and the drawing processing data through the network 5. The extracted input operation data group is stored in the user operation table 22, and the extracted drawing processing data group is stored in the drawing processing table 23.

The assumed-position calculation unit 14 takes one item of input operation data out of the extracted input operation data group. The assumed-position calculation unit 14 takes the drawing processing data corresponding to the one item of input operation data being taken out, from the extracted drawing processing data group. The assumed-position calculation unit 14 calculates a relative coordinates position of the drawing area with respect to coordinates of the mouse cursor from coordinates of the mouse cursor and coordinates of the drawing area for the drawing processing data that are included in the input operation data being taken out.

As described below, the assumed-position calculation unit 14 may take out the last item of input operation data in the input operation data group and the last item of drawing processing data in the input operation data group and may calculate the relative position from the items of data being taken out. Furthermore, the assumed-position calculation unit 14 may take out the second item of input operation data to the last input operation data or one among the items of input operation data subsequent to the second item of input operation data in the input operation data group and the second item of drawing processing data to the last item of drawing processing data or one among the items of drawing processing data subsequent to the second item of input operation data in the drawing processing data group, and may calculate the relative position from the items of data being taken out.

For example, the drawing processing corresponds one-to-one to the input operation such as the "pressing of the mouse button." The reason for this is because in such a case as scroll drawing performed by the pressing of the mouse button, a speed at which the user, a human being, may operate a keyboard is significantly slow compared to a processing capability of a computer. On the other hand, with the positional information on the cursor obtained by the mouse operation, in most cases, the input operation is notified in significant detail. In such a case, in some cases, the drawing processing corresponds many-to-one to the input operation. Consequently, it is preferable that the assumed-position calculation unit 14 take the input operation data and the drawing processing data that the drawing process with respect to the input operation such as the "pressing of the mouse button" corresponds one-to-one to, out of the input operation data group and the drawing processing data group and calculate the relative position.

Based on the calculated relative coordinates position, the assumed-position calculation unit 15 calculates coordinates that are assumed to be included in the input operation data, from a different item of drawing process data that is included in the drawing processing data group.

Based on the assumed coordinates, the associating unit 16 associates the input operation data that is included in the input operation data group, with the different item of drawing processing data.

The response time calculation unit 17 calculates the response time that is a difference in transmission times between the input operation data and the drawing processing data that are associated with each other in the associating unit 16.

Next, data structures of various items of data that are stored in the storage unit 20 of the capture server 4 are described.

The operation log table 21 is a table in which operation log information on the data that is transmitted and received between the client apparatus 1 and the service server 2 is stored. One example of the operation log information that is stored in the operation log table 21 is illustrated in FIG. 6A. The operation log table 21 includes headings that are time information (time) 21*a*, client information 21*b*, a server information 21*c*, a type 21*d*, a command (command name) 21*e* and a command argument (Args) 21*f*. The time information 21*a* indicates the time at which data is transmitted. The client information 21*b* indicates an IP address (Client address) of the client apparatus 1. The client information 21*b* may include a port number (Client port) of the client apparatus 1. The server information 21*c* indicates an IP address (Server address) of the service server 2. The server information 21*c* may include a port number (Server Port) of the service server 2. The type information 21*d* indicates whether the input operation data (REQ or the drawing processing data (RES) is transmitted. The command 21*e* indicates command contents of the input operation data or the drawing processing data, and the command argument 21*f* indicates an argument of the command 21*e*.

Moreover, illustrated in FIG. 6B is an example in which among pieces of operation log information illustrated in FIG. 6A, a result of the area-copying drawing processing (T) and a result of the image-drawing drawing processing (U) are transmitted from the service server 2 in response to the input operation (S) that is the pressing of the mouse button in a scroll bar area. A left screen of FIG. 6B indicates a state immediately before the mouse button is pressed. A right screen of FIG. 6B indicates a state in which the mouse button was pressed just a moment ago.

When the mouse button is pressed (S), as illustrated in the left screen of FIG. 6B, a screen is scrolled upward. Such change of the screen that the screen is scrolled upward in this manner may be expressed as copying a designated one area from below to above by designating one area of the screen (T) and drawing a new screen in an area under the copied one region (U). Both of the "copying from below to above of the area (T)" and the "new drawing (U)" are drawing processing that occurs when the screen is scrolled upward.

In the remote desktop system 10, the drawing processing data for the screen update is sent from the service server 2 to the client apparatus 1, and the display on the screen is updated in the client apparatus 1 in accordance with the data that is received. At that time, as illustrated in FIG. 6B, in the screen update, generally, only a portion desired to be updated, not an entire screen, is partitioned into small areas, and a group of small areas are transmitted to the client apparatus 1. In the client apparatus 1, a screen is configured that is updated by the data for the small area being reflected in the screen display according to the coordinates. At this time, a command for notifying how many small areas the items of data that are set for the screen display at that time relate to is determined. An example of this is the "frame transmission completion" command described above, and the screen display that is configured by a data group that is inserted between these commands is called a frame (and by the screen that is displayed until immediately before the data group).

Specifically, coordinates and a size of a copy source with respect to the immediately-preceding frame and coordinates of a copy destination are transmitted to the client apparatus 1 without the data for drawing in the immediately-preceding frame being again sent. In the client apparatus 1, designated-size image data is collected from the coordinates and size of the designated copy source and is displayed at coordinates of the designated copy destination. By doing this, the update of the screen may be performed without sending all the items of data for the screen. According to the present embodiment, this is performed with an "area copy" command. Usage examples of this are scroll processing and the like.

A list of the extracted input operation data groups within a predetermined period is recorded in the user operation table 22. FIG. 7 illustrates one example of information that is stored in the user operation table according to one embodiment. As one example of the user operation, the "movement of the window by the mouse (mouse move)" is illustrated in FIG. 7. In this case, the input operation data that is stored in the user operation table 22 includes headings that are transmission time information 22a on the input operation data and coordinates (X, Y) 22b on the screen, which correspond to the "movement of the window by the mouse."

With the movement of the window by the mouse, a user operation command occurs in a sequence of "mouse button pressing," "mouse cursor movement (a multiple number of times)," and "mouse button releasing."

Accordingly, the user operation table 22 according to the present embodiment lists in chronological order coordinates that are contained in the input operation data in the input operation data group that, according to a "mouse cursor movement" command that occurs within a predetermined period, is extracted from the items of operation log information that are accumulated in the operation log table 21 (a user operation list).

The drawing processing table 23 lists in chronological order the drawing processing data group that, according to the "area copy" command that occurs within a predetermined period, is extracted from the items of operation log information that are accumulated in the operation log table 21 (a drawing processing list). FIG. 8 illustrates one example of the drawing processing data that is stored in the drawing processing table 23 according to one embodiment. For example, the drawing processing data includes headings that are transmission time information 23a on the drawing processing data, coordinates 23b of the copy source (X, Y), and coordinates 23c of the copy destination (X, Y).

Here, the predetermined period may be a period of time (for example, 150 milliseconds that is the limit value of the waiting time of the response with respect to the interactive input operation) from when the input operation in accordance with the pressing operation of the mouse button by the user occurs to when the operation of pushing up the mouse button (releasing the mouse button), and may be a period of time that is obtained by adding time α to such a period of time. The time α may be determined by considering a delay time in the drawing processing or the data communication.

A response time that is a time difference between the time taken for transmission of the input operation data and the time taken for reception the drawing processing data is stored in the response time table 24.

[Associating the Input Operation Data with the Drawing Processing Data]

As illustrated in FIG. 3, in a case of the user operation such as the scroll drawing performed by the "pressing and releasing of the mouse button (cursor key)," the input operation data in accordance with the user operation in the client apparatus 1 corresponds one-to-one to the drawing processing data. This is because the speed at which the user, a human being may operate the mouse or the keyboard is significantly slow compared to the processing capability of the computer.

Thus, it is preferable that the end of a predetermined period when the data extraction unit 13 extracts the input operation data group and the drawing processing data group be set to the time when the "releasing of the mouse button" command is completed, not the time when the "mouse move" command is completed. When this is done, because the drawing processing corresponding to the last input operation in the input operation data group occurs reliably, a section may be extracted in which the last item of input operation data corresponds one-to-one to the last drawing operation data in the drawing processing data group.

In a method of associating the input operation data with the drawing processing data according to the first and second embodiments, which is described below, the user operation (input operation) is associated with the drawing processing with the following three steps.

(Step 1: Extraction of a Range of User Operation)

Figure 9:
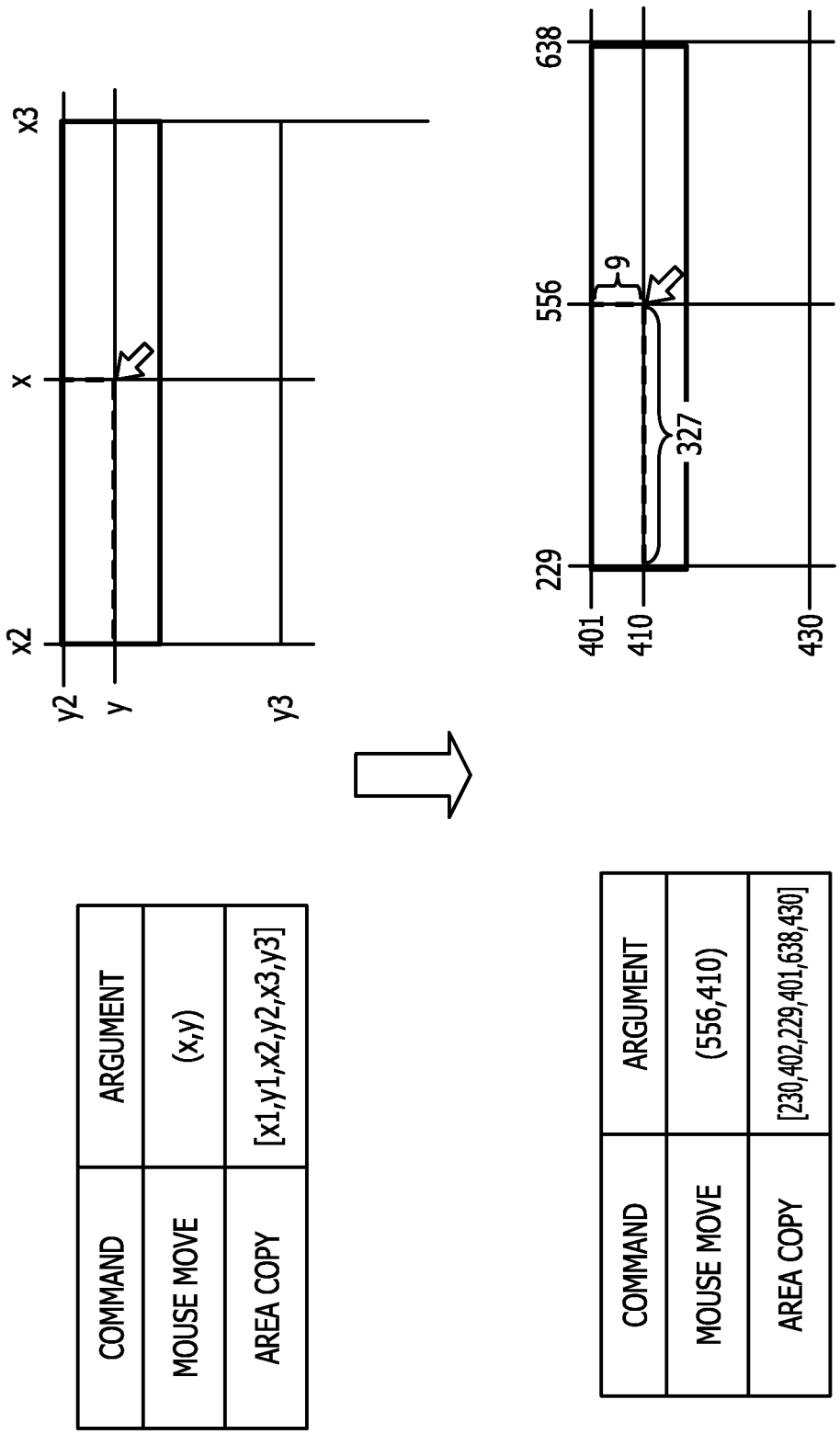
FIG. 9 is a diagram illustrating one example of relative coordinates according to one embodiment.

In Step 1, a range of the user operation is extracted. In Step 1, relative coordinates are calculated from coordinates of the mouse cursor and from coordinates of a window that is drawn. One example of the calculation of the relative coordinates is described referring to FIG. 9. FIG. 9 is a diagram illustrating an example of the relative coordinates according to one embodiment.

In Step 1, relative coordinates between the window that is drawn and the mouse cursor are calculated from coordinates of the "mouse move" command for the last item of input operation data in the input operation data group and from coordinates of the drawing area according to the "area copy" command for the last item of drawing processing data in the drawing processing data group. In the upper portion of FIG. 9, the relative coordinates between the window and the mouse cursor of the copy destination are calculated from the last coordinates (x, y) of the "mouse move" command, and from coordinates (x2, y2) of an upper left corner of the copy destination among coordinates of the last area (x1, y1, x2, y2, x3, y3) in coordinates of the "area copy."

Moreover, coordinates (x1, y1) are coordinates of an upper left corner of the window of the copy source, coordinates (x2, y2) are coordinates of the upper left corner of the window of the copy destination, and coordinates (x3, y3) are coordinates of a lower right corner of the window of the copy destination. Among coordinates of the "area copy" command in FIG. 8, copy destination coordinates (X, Y) 23c are equivalent to coordinates (x2, y2) of an upper left corner of the window. Moreover, in an example of coordinates of the "area copy" command in FIG. 8, coordinates (x3, y3) of a lower right corner of the window are not illustrated.

For example, descriptions are provided referring to the example of the input operation data group illustrated in FIG. 7 and the example of the drawing processing data group illustrated in FIG. 8. Among coordinates under that heading of the coordinates 22b of the "mouse move" command, which is an input operation example illustrated in FIG. 7, the last coordinates (x, y) are (556, 410). Furthermore, in an example of the drawing processing illustrated in FIG. 8, coordinates (x2, y2) of an upper left corner of the last area at coordinates 23b and 23c of the "area copy," that is, the copy destination coordinates (X, Y) 23c are (229, 401). Consequently, as illustrated in the lower portion of FIG. 9, the relative coordinates between the window that is drawn and the mouse cursor are calculated as (327, 9), from the last coordinates (556, 410) of the "mouse move" and from coordinates (229, 401) of the upper left corner of the last area in the coordinates of the "area copy."

(Step 2: Extraction of a Range of the Drawing Processing)

Figure 10:
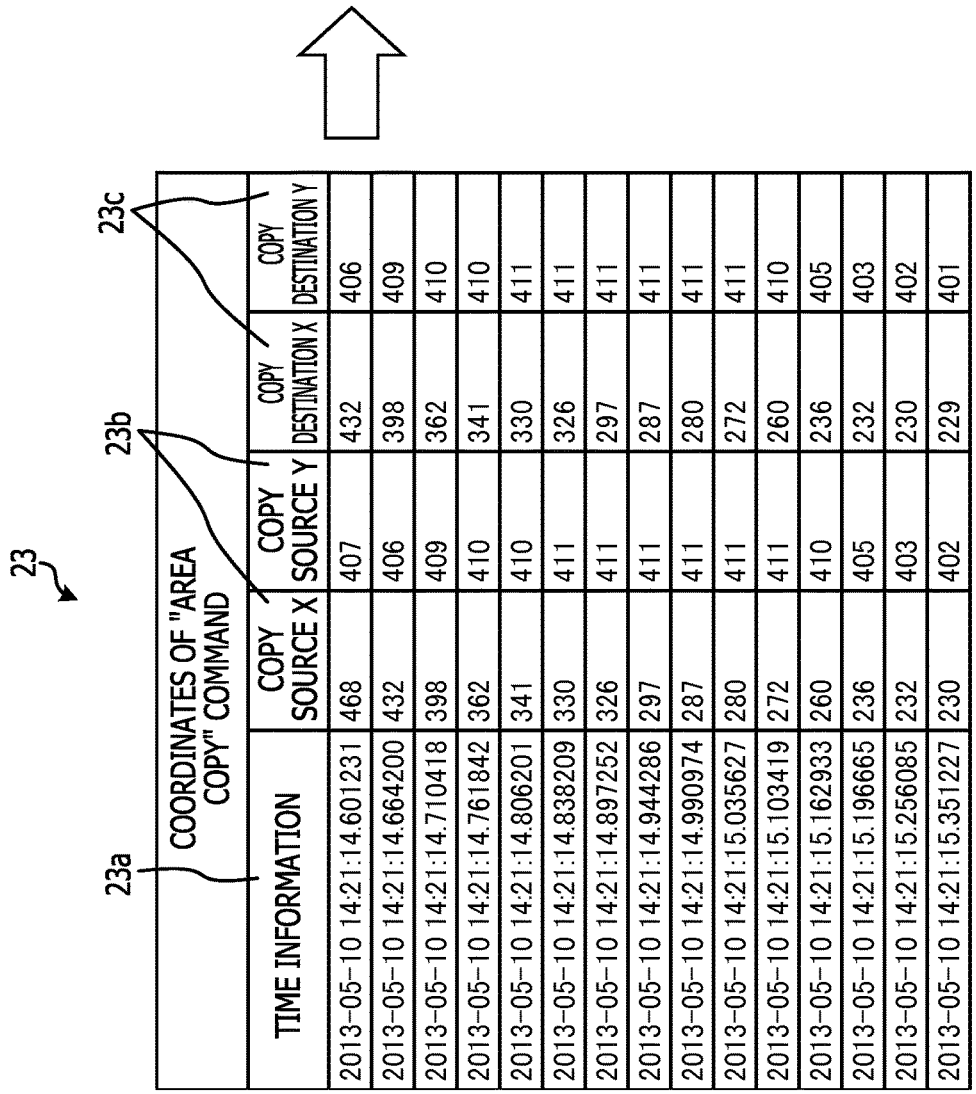
FIG. 10 is a diagram illustrating one example of coordinates of a cursor that are assumed, according to one embodiment.

In Step 2, a range of the drawing processing is extracted. In Step 2, coordinates (logical coordinates at which the corresponding mouse cursor has to be present) of the mouse cursor that are assumed with respect to each drawing area are calculated based on the relative coordinates that are calculated in Step 1. An example in which the coordinates of the mouse cursor that are assumed are calculated from the drawing processing data group is described referring to FIG. 10. FIG. 10 illustrates one example of coordinates of the mouse cursor that are assumed, according to one embodiment.

In Step 2, coordinates of the mouse cursor that are assumed by adding the relative coordinates to coordinates 23c of the "area copy" command are calculated. For example, relative coordinates (327, 9) are added to coordinates (432, 406) that are the first coordinates 23c of the "area copy" command in a left table in FIG. 10, and thus coordinates (759, 415) of the mouse cursor that are assumed, and that are displayed in a right table in FIG. 10 are calculated. In this manner, the coordinates of the mouse cursor that are assumed may be calculated from the coordinates 23c of all the "area copy" commands of the obtained drawing processing data group.

As described above, in Step 2, the thinning-out illustrated in FIG. 4A is considered, that is, the fact that the input operation data does not correspond one-to-one to the drawing processing data is considered, and the coordinates of the mouse cursor are assumed from the coordinates of the drawing processing data in such a manner as to remove an influence of the thinning-out.

(Step 3: Associating of the User Processing with the Drawing Processing)

Figure 11:
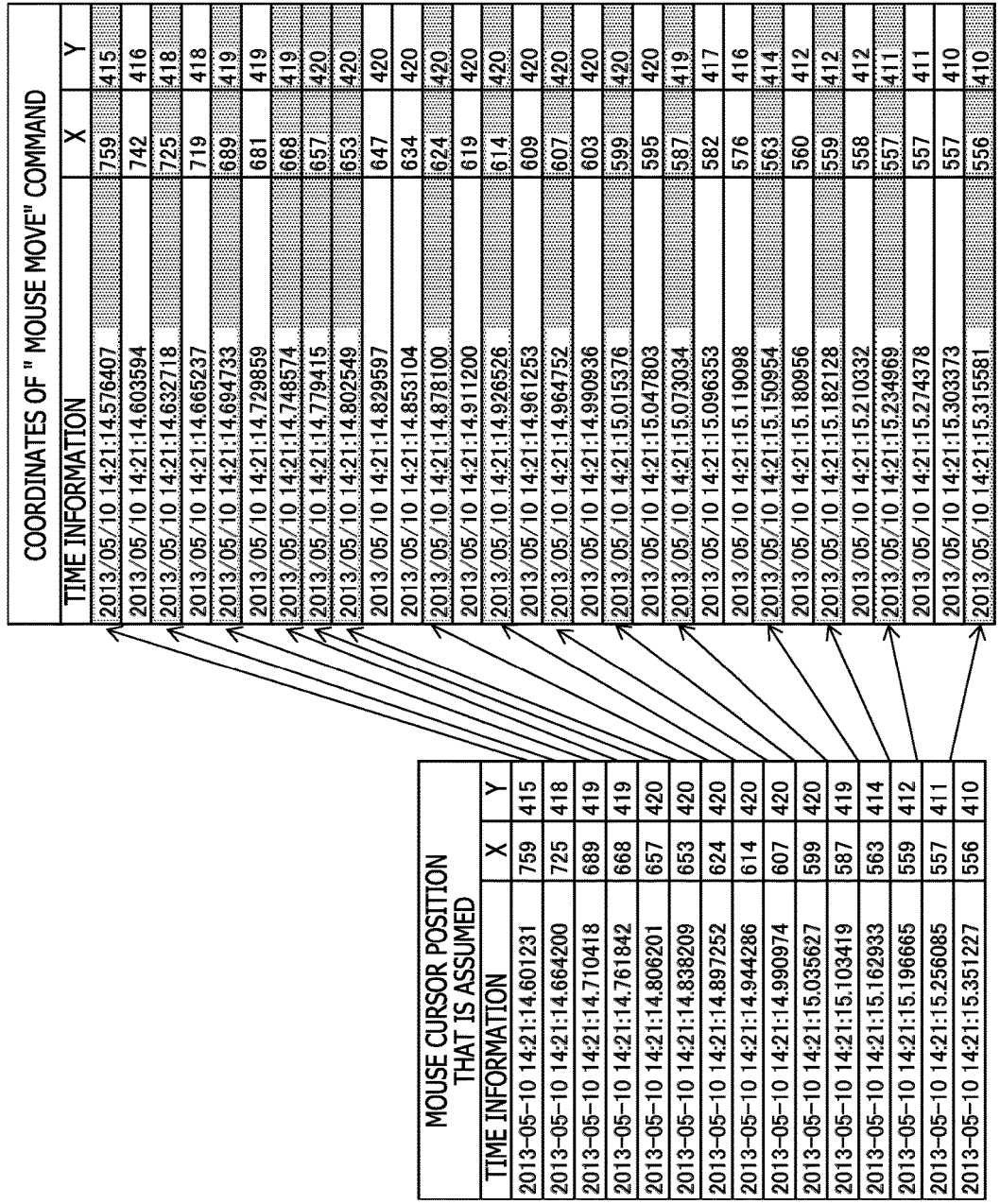
FIG. 11 is a diagram of one example of associating according to one embodiment.

In Step 3, the user processing is associated with the drawing processing. In Step 3, the input operation data (user operation) is associated with the drawing processing data from the coordinates of the mouse cursor that are calculated in Step 2 and that are assumed and from the coordinates of the mouse cursor that are included in the input operation data. FIG. 11 illustrates one example of a result of associating a position of the mouse cursor that is calculated in Step 2 and that is assumed, with the coordinates of the "mouse move" command for the input operation data group in FIG. 7. At this point, the user operation table 22 is searched for the "mouse move" command that has coordinates which agrees with the position of the mouse cursor that is assumed, and the "mouse move" command that is found to agree with the position of the mouser cursor is associated with the corresponding drawing processing data. In a right table in FIG. 11, the associated "mouse move" command is indicated by the blank space being colored. By the associating, the drawing process in response to the input operation may be identified in the remote desktop system 10.

With the three steps described above, in the associating method according to the present embodiment, the response time may be measured with precision in the remote desktop system 10. By doing this, performance or quality of the remote desktop system 10 may be correctly evaluated based on the response time. The associating method according to the present embodiment is described below as being divided into an associating method according to a first embodiment and an associating method according to a second embodiment.

First Embodiment

[Associating Processing that is Performed in the Capture Server]

Figure 12A:
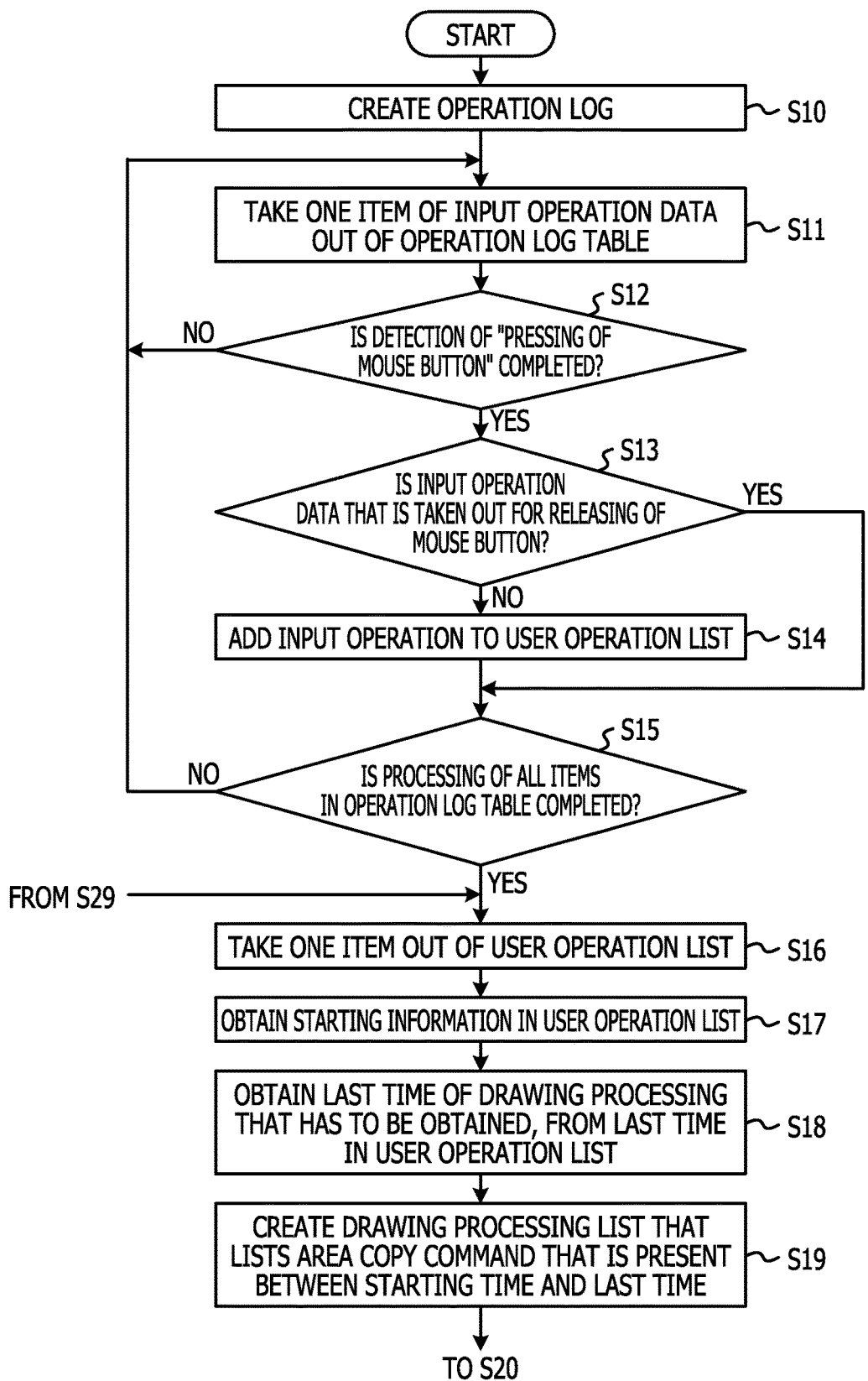
Figure 14A:
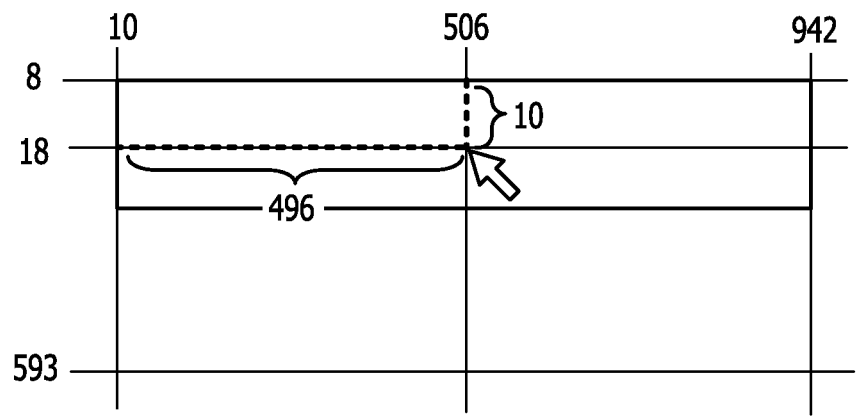
FIGS. 14A and 14B are diagrams illustrating one example of relative coordinates and one example of coordinates of a cursor being assumed, respectively, according to the first embodiment.
Figure 14B:
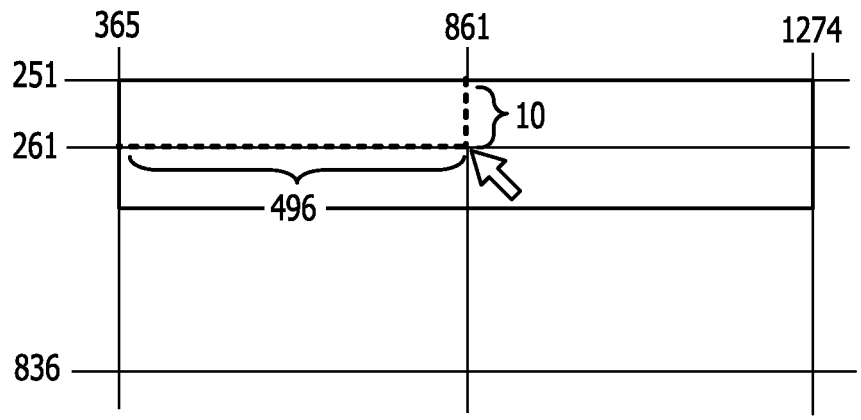

One example of the associating processing that is performed in the capture server 4 according to the first embodiment is described in detail referring to FIGS. 12 to 14. FIG. 12 (FIG. 12A, FIG. 12B) is a flowchart illustrating the associating processing according to the first embodiment. FIG. 13 (FIG. 13A, FIG. 13B) illustrates one example of information that is stored in an operation log table according to the first embodiment. FIGS. 14A and 14b illustrate one example of the coordinates of the relative coordinates and one example of the coordinates of the cursor being assumed, respectively, according to the first embodiment. At this point, as an example, a case is described where the user performs an operation of moving the window on the screen using the mouse cursor. To sum up, described is the associating processing that is performed in the capture server 4 in accordance with an operation in which the mouse button is pressed by the user operation, the mouse cursor is moved, and the mouse button is released.

When the associating processing in FIG. 12 starts, the capture unit 11 obtains the input operation data that is transmitted from the client apparatus 1 and the drawing processing data that is transmitted from the service server 2. The L7 analysis unit 12 analyzes the binary data obtained by the capture unit 11, converts the analyzed binary data, and generates information on the input operation data and information on the drawing processing data. The generated input operation data and drawing processing data are stored in the operation log table 21 of the storage unit 20 (Step S10). One example of the operation log table 21 is illustrated in FIG. 13. In the operation log table 21, a command "mouse move" indicates a mouse movement by the user. A "command argument" of a "mouse move" command is coordinates of a position of the cursor that is included in the input operation data of the "mouse move" command.

A command "copy rect cmd" indicates copying of a window area that is included in the drawing processing data of the "area copy" command and that is drawn. Coordinates of an "upper left corner of the copy source," an "upper left corner of the copy destination," and a "lower right corner of the copy destination" of the window that is moved are sequentially designated in the "command argument" of the "area copy" command.

A command "send desk picture" indicates copying of the window area that is included in the drawing processing data of a "new drawing" command and that is drawn. An "image format," "coordinates of an upper left corner of the drawing area," and a "width and height of the image data" are sequentially designated in the "command argument" of the "new drawing" command. A command "send desk flush image" indicates actual starting of display drawing in the client apparatus 1.

A command "mouse button down/mouse button up" indicates an operation of pushing down/pushing up the mouse button that is performed by the user. With the "command argument" of the "mouse button down and mouse button up" command, which button is pressed and released is notified. Moreover, "Btn=0" indicates a left button.

The data extraction unit 13 takes one item of input operation data out of the operation log table 21 (Step S11). By doing this, any one is taken out of the items of input operation data that are listed in lines in FIG. 13. The input operation data may be determined by the type that is included in each item of input operation data in the operation log table 21 in FIG. 13. The data extraction unit 13 takes the items of input operation data sequentially (Step S11) until it is determined that the input operation data being taken out is for an operation of "pushing down the mouse button" (Step S12). If the input operation data being taken out is for the operation of "pushing down the mouse button," proceeding to Step S13 takes place. Then, the storage unit 20 takes the input operation data out of the operation log table 21 until the input operation data that is taken out in Step S13 is for an operation for "pushing up the mouse button" and creates the user operation list (Step S14). Next, the data extraction unit 13 determines whether or not all items of data stored in the operation log table 21 have been processed (Step S15). If it is determined that all the items of data have not been processed, the data extraction unit 13 returns to Step S11, takes out the next input operation data, and performs the processing in each of Steps S12 to S15.

By doing this, a "mouse move" command group is extracted that is present between the "mouse button down" command in the second line from top and the "mouse button up command in the third line from button" in the user operation table 22 illustrated in FIG. 13. By extracting the "mouse move" command group in this manner, the user operation list is created that lists a range of the input operation (user operation) data, which corresponds to step one among the three steps of the associating method described above according to the present embodiment. The user operation list is equivalent to the input operation data group.

If all the items of data have been processed, the data extraction unit 13 takes one item of input operation data out of the user operation list that is stored in the user operation table 22 (Step S16).

Next, the data extraction unit 13 obtains a starting time from time information on the input operation data group being taken out (Step S17). Next, the data extraction unit 13 obtains the last time of the drawing processing that has to be obtained, from the time information on the last item of input operation data in the input operation data group being taken out (Step S18).

Next, the data extraction unit 13 creates the drawing processing list that lists a "copy rect cmd" command group ("area copy" command group) that is present between the obtained starting time and ending time and that is extracted (Step S19). By extracting the "area copy" command group in this manner, the drawing operation list is created that lists a range of the drawing processing data, which corresponds to step two among the three steps of the associating method described above according to the present embodiment. In the example in FIG. 13, the drawing processing list is created that lists an extracted range of the image processing data of the "copy rect cmd" command in a predetermined range starting from "mouse bottom up" in the third line from bottom. The drawing processing list is equivalent to the drawing processing data group.

Next, the assumed-position calculation unit 14 obtains coordinates that are included in the last image processing data in the drawing processing list (Step S20). Subsequently, the assumed-position calculation unit 14 obtains coordinates that are included in the last item of input operation data in the user operation list (Step S21). Subsequently, the assumed-position calculation unit 14 calculates the relative coordinates from the coordinates of the upper left corner that are included in the last image processing data in the drawing process list, and from the coordinates that are included in the last item of input operation data in the user operation list (Step S22).

In the example in FIG. 13, when the commands in (1) from the "the communication I/F 107" command to the "mouse button up" command are referred to, coordinates (X, Y) of the last item of input operation data (2) are (506, 18). Furthermore, when the extracted "area copy" command is referred to, coordinates (X2, Y2) of an upper left corner of the window of the last image processing data (3) are (10, 8). By doing this, as illustrated in FIG. 14A, the relative position is calculated as (496, 10).

Next, the assumed-position calculation unit 15 calculates a logical position of the mouse cursor (position of the mouse cursor that is assumed) with respect to the drawing process data that is listed in the drawing processing list (Step S23). For example, in the example in FIG. 13, the position of the mouse cursor that is assumed is calculated with respect to items of drawing processing data (4), (6), and (7) of the "area copy" command, among extracted items of drawing processing data other than drawing processing data (3) of the last "area copy" command. For example, in a case of the drawing processing data (4), coordinates (X, Y) of an upper left corner of a copy destination area of the window area are (365, 251). As illustrated in FIG. 14B, the relative coordinates (496, 10) that are obtained in advance are added to the coordinates (365, 251) and thus coordinates (861, 261) that are assumed as the logical position of the mouse cursor are calculated.

Referring back to FIG. 12, the associating unit 16 takes one item of drawing processing data out of the drawing processing list (Step S24). The associating unit 16 conducts a search to find whether or not the input operation data of the "mouse move" command that agrees with the coordinates that are assumed is stored in the user operation table 22. If the input operation data that agrees with the coordinates that are assumed is stored in the user operation table 22, the associating unit 16 performs the corresponding drawing processing due to the input operation, and thus associates the input operation data with the drawing processing data (Step S25). Moreover, in the example in FIG. 13, the associating unit 16 may set the associating-target input operation data to be for only the "mouse move" command that is earlier in time series than the "copy rect cmd (area copy)" command of the drawing processing data (4). In the example in FIG. 13, the input operation data (5) of the "mouse move" command that agrees with the coordinates that are assumed from the drawing processing data (4) is associated.

Next, the associating unit 16 deletes an entry (item) that is present earlier in time series than the associated operation, from an extracted operation group (Step S26). In the example in FIG. 13, the input operation data of the "mouse move" command that is present earlier in time series than the image processing data (4) is deleted. Moreover, Step S26 may be omitted, but it is preferable that Step 26 not be omitted in order to effectively use the operation log table 21.

Thereafter, In Step S27, the assumed-position calculation unit 15 calculates assumed coordinates of the mouse cursor that are assumed with respect to the drawing processing data that is included in the drawing processing list, and from which the assumed coordinates have not been calculated. Then, the associating unit 16 performs the associating processing in Steps S24 to S27 until the processing has been performed on all the items of drawing processing data that are included in the drawing processing list (Step S28). By doing this, in the example in FIG. 13, the coordinates that are assumed as the logical position of the mouse cursor, are calculated in the same manner also with respect to items of the drawing processing data (6) and (7), and the input operation data of the "mouse move" command that agrees with the coordinates that are assumed is associated.

The associating processing in each of Steps S24 to S28 is performed on all the items of drawing processing data that are included in the drawing processing list (Step S28) until the processing of associating all the items of input operation data that are included in the user operation list is completed (Step S29). When all associating processing end, the present processing ends.

As illustrated above, with the capture server 4 according to the first embodiment, the drawing processing from the service server 2 with respect to the input operation by the client apparatus 1 may be identified in the remote desktop system 10. By doing this, the input operation data may be associated with the drawing processing data that is obtained as a result of the drawing processing in accordance with the input operation. To sum up, the capture server 4 calculates the "input operation in accordance with the user operation" and the relative coordinates that are a deviation of coordinate information on the "drawing processing," calculates the coordinates of the mouse cursor that are assumed using the relative coordinates, and specifies the input operation data that has coordinates that agree with the calculated coordinates of the mouse cursor. The input operation data that is specified in this manner is associated with the drawing processing data. The response time may be measured with precision from a difference in time information between the input operation data and the drawing processing data that are associated with each other. As a result, the performance and quality of the remote desktop system 10 may be evaluated based on the precise response time.

Second Embodiment

Figure 15:
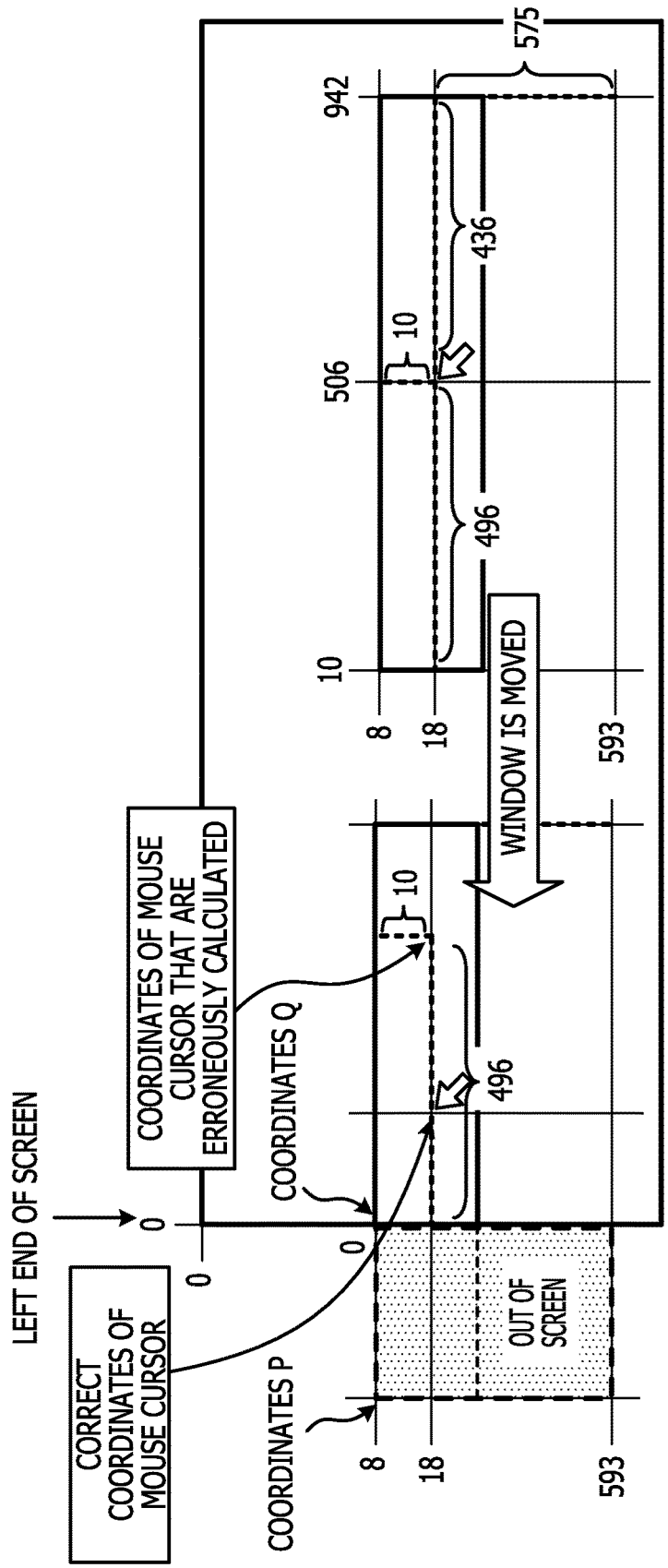
FIG. 15 is a diagram for describing the associating processing according to a second embodiment.
Figure 16:
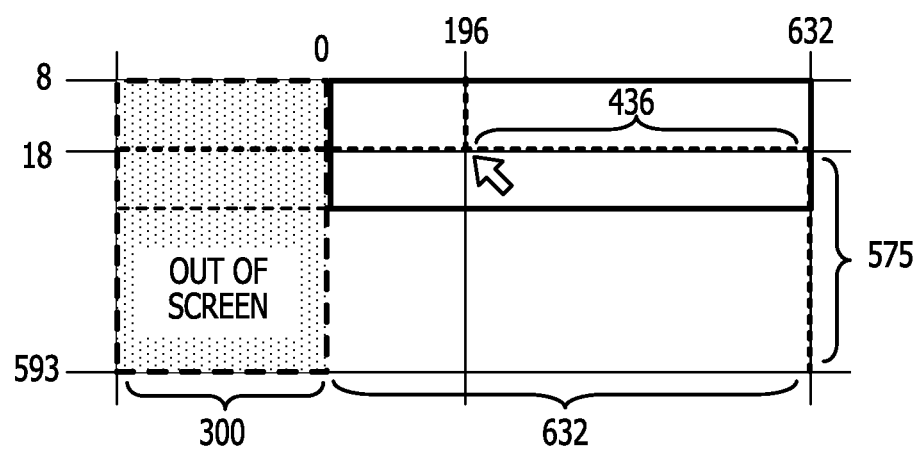
FIG. 16 is a diagram for describing the associating processing according to the second embodiment.
Figure 18A:
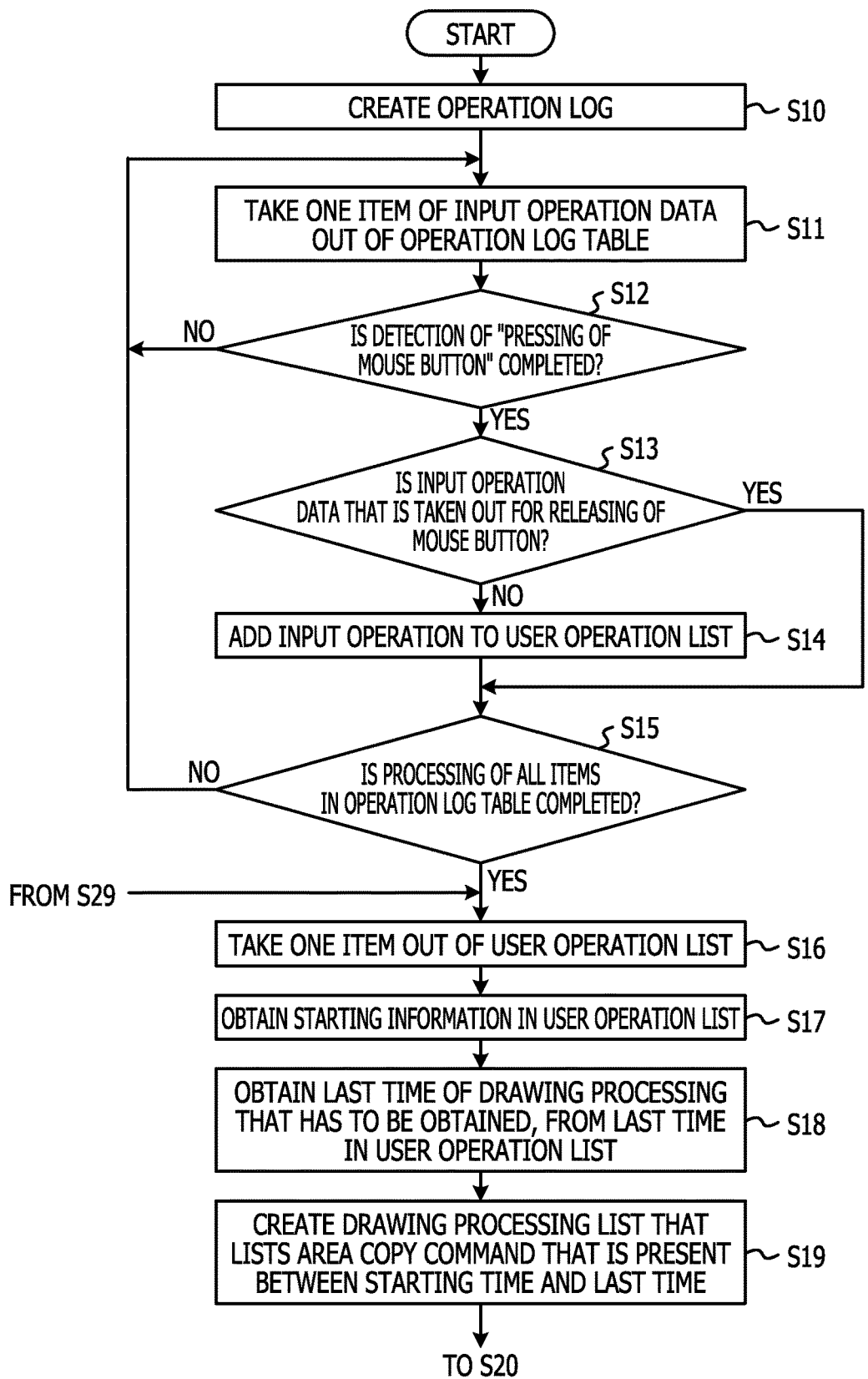
FIGS. 18A and 18B is a flow chart illustrating the associating processing according to the second embodiment.
Figure 18B:
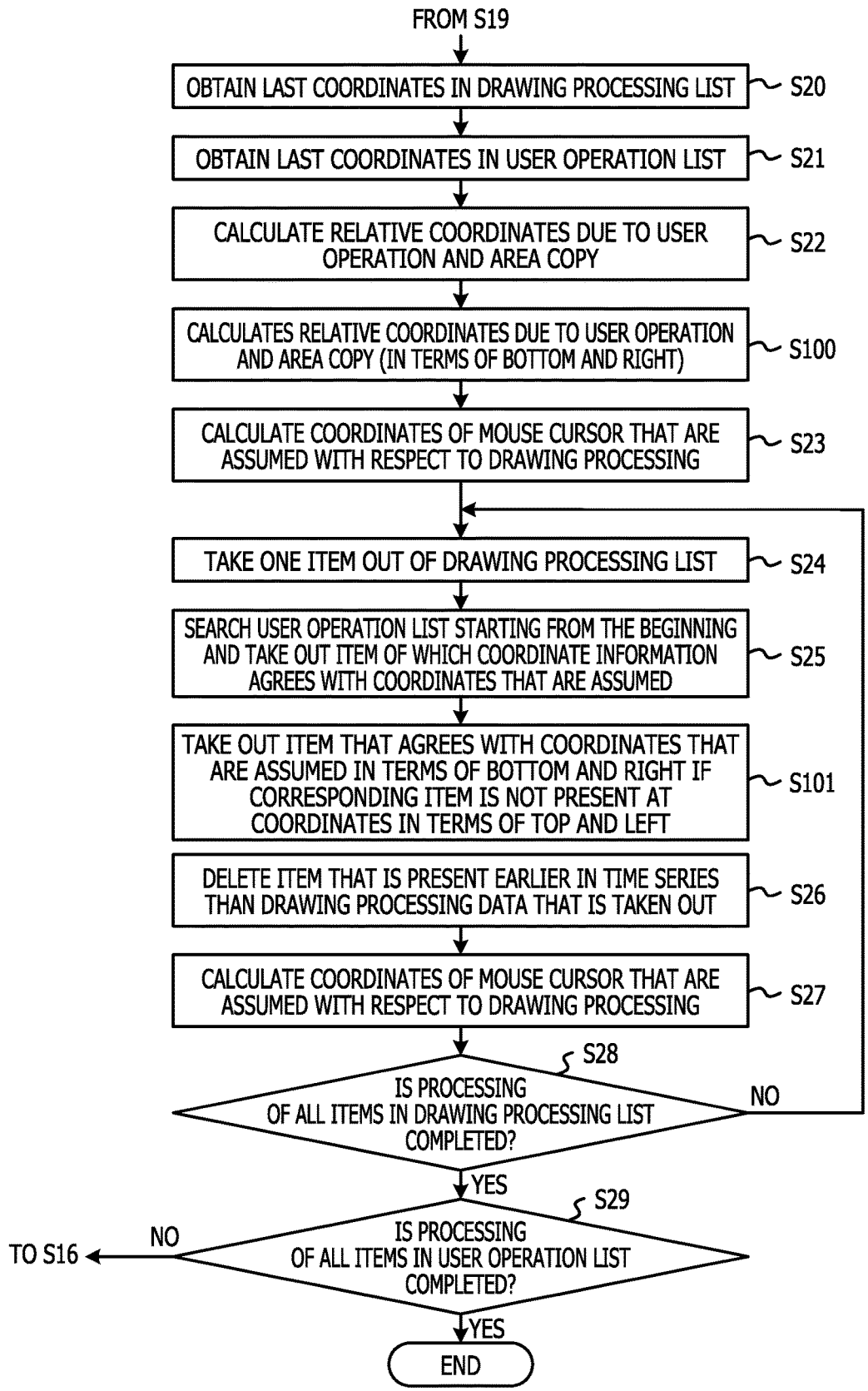

Next, one example of the associating processing that is performed in the capture server 4 according to the second embodiment is described referring to FIGS. 15 to 18. FIGS. 15 and 16 are diagrams for describing associating processing according to the second embodiment. FIG. 17 (17A, 17B) illustrates one example of information that is stored in an operation log table according to the second embodiment. FIG. 18 (18A, 18B) is a flowchart illustrating the associating processing according to the second embodiment. At this point, as an example, a case is described where the user performs an operation of moving the window on the screen using the mouse cursor in the same manner as is the case according to the first embodiment.

According to the first embodiment, the relative coordinates are obtained in a state where coordinates of an upper left corner of a copy destination area, which are included in the drawing processing data of the "area copy" command, serve as a reference. However, as illustrated in FIG. 15, when the mouse is moved such that a left end of the window is positioned farther away from the center than a left end of the screen, information on a portion out of a range of the screen is not notified as the copy destination area. Thus, although the relative position of the mouse cursor from coordinates P of an upper left corner of the window has correct coordinates of the mouse cursor, a case is considered where the relative position of the mouse cursor from coordinates Q with respect to an upper left corner of the screen within the window area is erroneously calculated.

Accordingly, according to the second embodiment, the assumed-position calculation unit 14 calculates the relative position of the mouse cursor from coordinates of an upper left corner of the window, in the same manner as in the associating method according to the first embodiment. In addition to this, according to the second embodiment, the assumed-position calculation unit 14 calculates the relative position of the mouse cursor from a lower right corner of the window.

For example, in the example in FIG. 13, when the commands in (1) from the "mouse move" command to the "mouse button up" command are referred to, coordinates (X, Y) of the last item of input operation data (2) are (506, 18). Furthermore, coordinates (x2, y2) of the upper left of the window are (10, 8) in the extracted drawing processing data (3) of the "area copy (copy rect cmd)" command. Consequently, as illustrated in coordinates on the right side of FIG. 15, the relative position of the mouse cursor from the coordinates of the upper left corner of the window is calculated as (496, 10) as is described according to the first embodiment.

In addition to this, according to the second embodiment, the relative position of the mouse cursor from coordinates of a lower right corner of the window is calculated. Coordinates (x3, y3) of the lower right corner of the window are (942, 593) in the extracted drawing processing data (3) of the "area copy" (copy rect cmd)" command. Consequently, the relative position of the mouse window with respect to the lower right corner of the window is calculated as (436, 575).

At this point, as illustrated in FIG. 16, an area for 300 dots on the left side of the window are set to be out of the screen. At this time, a coordinate x of a left end of the copy destination area, which is included in the drawing processing data of the "area copy" command is set to 0. To sum up, coordinates (x2, y2) of an upper left corner of the copy destination area of the "area copy" command are set to (0, 8). For example, according to the second embodiment, the input operation data and the drawing processing data that are stored in the operation log table 21 that is illustrated in FIG. 17 are set to be used. In this case, according to the first embodiment, differences between the input operation data and the drawing processing data that are stored in the operation log table 21 are only items of difference data that are listed in the central portion. Among the items of difference data, with the "area copy" command, it is notified that coordinates (x3, y3) of a lower right corner of the copy destination area are (632, 593).

When the coordinates that are assumed, of the mouse cursor are calculated in a state where the coordinates of the upper left corner that are included in the "area copy" command described above serve as a reference, the result is (496, 18). The actual correct coordinates are (196, 18), and the input operation data is not correctly associated with the drawing processing data.

In this case, when the coordinates that are assumed, of the mouse cursor are calculated in a state where the coordinates of the lower right corner that are included in the "area copy" command serve as a reference, the result is (206, 18), and the correct coordinates of the mouse cursor are obtained. Accordingly, according to the second embodiment, since the coordinates of the mouse cursor that are assumed are calculated using the multiple coordinates at which the window area is fixed, the input operation data is correctly associated with the drawing processing data.

[Associating Processing that is Performed in the Capture Server]

The associating processing according to the second embodiment, as illustrated in FIG. 18, is different from the associating processing according to the first embodiment in Steps S100 and S101. Consequently, for portions of associating processing that are the same as those according to the first embodiment, the same steps as those illustrated in the flow chart of the associating processing in FIG. 12 according to the first embodiment are provided. To sum up, because Steps S10 to S22, S23 to S25, and S26 to S29 that are illustrated in FIG. 18 are the same processing as Step S10 to S29 in FIG. 12, their descriptions are omitted.

In Step S100, the assumed-position calculation unit 14 calculates coordinates of a lower right corner that are included in the last image processing data in the drawing processing list, and the relative coordinates (relative coordinates in terms of the bottom and the right) from coordinates that are included in the last item of input operation data in the user operation list. Next, Steps S23 to S25 are performed. The associating unit 16 associates the input operation data that is calculated based on the relative coordinates in terms of the top and the left in Step S22 and that agrees with the coordinates of the mouse cursor that are assumed in terms of the top and the left. However, in some cases, the input operation data is not present that agrees with the coordinates that are assumed in terms of the top and the left, of the mouse cursor. Even though such a case may occur, according to the second embodiment, in Step S101, the associating unit 16 associates the input operation data that is calculated based on the relative coordinates in terms of the bottom and the right, and that agrees with the coordinates that are assumed in terms of the bottom and the right, of the mouse cursor.

As described above, in the capture server 4 according to the second embodiment, the "input operation data based on the user operation," which the capture server 4 obtains based on the multiple logical coordinates (coordinates that are assumed) and the "drawing processing" may be associated with each other with more precision. The response time is measured with more accuracy from the difference in time information between the "input operation data" and the "drawing processing data" that are associated with each other in this manner. As a result, based on the response time, the accuracy with which the performance or quality of the remote desktop system 10 is evaluated may be further increased.

An example in which, according to each of the embodiments described above, the response time is calculated from the difference between the input operation data and the drawing processing data that are associated with each other is illustrated in FIG. 19. FIG. 19 illustrates one example of information that is stored in the response time table. The response time calculation unit 17 calculates the response time from the input operation that is the "mouse move" to actual screen drawing, from the difference in time information between the input operation data and the drawing processing data. For example, the evaluation of the performance or quality of the remote desktop system 10 may be performed based on a representative value, such as an average value or median of the response times.

(Example of a Hardware Configuration)

Figure 20:
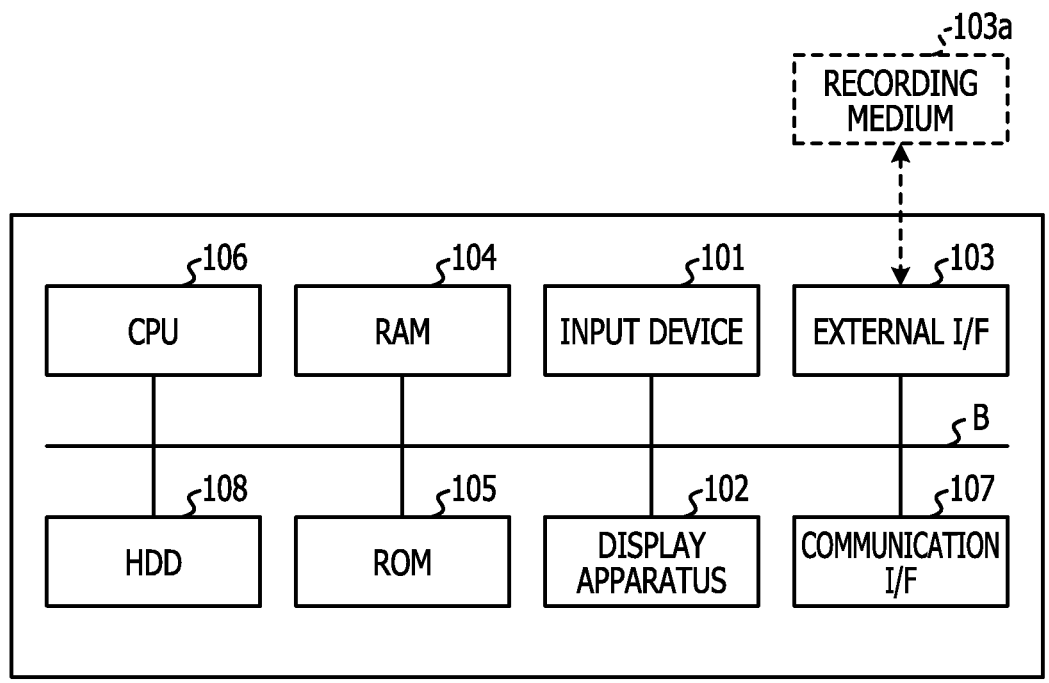
FIG. 20 is a diagram illustrating one example of a hardware configuration of a capture server according to one embodiment.

Lastly, an example of a hardware configuration of the capture server 4 according to one embodiment is briefly described. FIG. 20 illustrates one example of the hardware configuration of the capture server 4 according to one embodiment.

The capture server 4 includes an input device 101, a display apparatus 102, an external I/F 103, a random access memory (RAM) 104, a read-only memory (ROM) 105, a central processing unit (CPU) 106, a communication I/F 107, and a hard disk drive (HDD) 108, which are connected to one another with a bus B.

Input devices 101 include a keyboard, a mouse, and the like. The input device 101 is used in inputting an operation command to the capture server 4 in accordance with operating of the mouse or the like by a user. Display apparatuses 102 include a display and the like. A result of system management is displayed on the display apparatus 102 for a manager of the capture server 4.

The communication I/F 107 is an interface that connects the capture server 4 to the network 5. With this configuration, the capture server 4 may obtain the input operation data or the drawing processing data through the communication I/F 107.

The HDD 108 is a nonvolatile storage device in which a program or data is stored. As the stored program or data, there are an operation system (OS) that is basic software that control an entire apparatus, application software that runs on the OS to provide various functions, and the like. Furthermore, an associating program that is executed by the CPU 106 to perform the associating processing described above, according to the embodiment is stored in the HDD 108.

The external I/F 103 is an interface to an external device. As the external device, there are a recording medium 103a and the like. The capture server 4 may perform reading and/or writing from and/or to the recording medium 103a through the external I/F 103. As the recording medium 103a, there are a compact disk (CD), a digital versatile disk (DVD), an SD memory card, a universal serial bus (USB) memory, and the like.

The ROM 105 is a non-volatile semiconductor memory (storage device). Basic input/output system (BIOS) software that is executed at the time of booting, programs such as ones for OS setting and network setting, or data are stored on the ROM 105. The RAM 104 is a volatile semiconductor memory (storage device) in which a program or data is temporarily stored. The CPU 106 is an arithmetic device that realizes control of an entire apparatus and functions with which the apparatus is equipped by reading a program or data from the storage device (for example, the "HDD" the "ROM," or the like) described above and loading the program or the data onto the RAM and by executing the program or performing processing of the data.

Each of the data extraction unit 13, the assumed-position calculation unit 14, the assumed-position calculation unit 15, the associating unit 16 and the response time calculation unit 17 is realized by processing that a program installed on the HDD 108 causes the CPU 106 to perform. The operation log table 21, the user operation table 22, and the drawing processing table 23, for example, may be realized using a storage device that is connected to the RAM 104, the HDD 108, or the capture server 4 through the network 5.

As described above, according to each of the embodiments, the input operation data and the drawing processing data are transmitted and received between the client apparatus 1 and the service server 2 in compliance with communication protocols. The capture server 4 according to each of the embodiments calculates a deviation of the coordinate information between the input operation data and the drawing processing data, and calculates logical coordinate information using the deviation. Based on the logical coordinate information, the actual "user operation" is associated with the "drawing processing." The capture server 4 measures the response time from the difference in time information between the input operation data and the drawing processing data that are associated with each other in this manner, and thus may measure the quality of the remote desktop system 10 with precision.

The associating method, the associating program, and the associating apparatus are described above according to each of the embodiments, but the present disclosure is not limited to the embodiments described above. Various modifications and improvements are possible within the scope of the present disclosure. Furthermore, according to the present disclosure, combinations of the technologies according to each of the embodiments described may be possible as long as they are not contradictory.

For example, according to the embodiments described above, as an example of the main input operation, the "movement of the window" is described that results from "moving the mouse cursor" on the screen based on the operating of the mouse or the keyboard by the user. However, without being limited to this, the input operations include an operation that includes coordinates in accordance with various screen operations performed by the user. For example, the input operation may be "a movement of any object" that is displayed on the screen or may be an operation other than the movement of the object that is displayed on the screen. Furthermore, the input operations may include not only an operation in accordance with a direct screen operation that the user performs using the mouse or the keyboard, but also an operation in accordance with a remote screen operation that results from a user's gesture.

With the associating method according to the present disclosure, even though the input operation data that is transmitted by the client apparatus and the drawing processing data that is received from the service server by the client apparatus are not necessarily obtained based on one-to-one correspondence, the performance or quality of the system may be evaluated with more precision.

Furthermore, with the associating method according to the present disclosure, the response time may be calculated for every user, by pieces of identification information on the users being included in the input operation data and the drawing processing data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method comprising:
   extracting, by a processor, an input operation data group that includes multiple items of input operation data and a drawing processing data group that includes multiple items of drawing processing data, each of the input operation data including coordinates in accordance with a screen operation in a remote desktop system, each of the drawing processing data including coordinates of an area on which drawing processing is performed in accordance with the screen operation, the screen operation being a screen operation during a predetermined period;
   specifying, by the processor, a relative position of a coordinate of a drawing area that is included in one item of drawing processing data among the extracted drawing processing data group, with respect to a coordinate that is included in one item of input operation data among the extracted input operation data group, the one item of input operation data being a last item of input operation data among a series of input operations of the extracted input operation data group during the predetermined period;
   specifying, by the processor, a coordinate that is assumed to be included in any item of input operation data which is included in the input operation data group, from a coordinate of a drawing area corresponding to one item of drawing processing data that is included in the drawing processing data group, based on the specified relative position, the one item of drawing processing data is the last item of drawing processing data during the predetermined period; and
   associating, by the processor, different input operation data that is included in the input operation data group, with the different drawing processing data, based on the coordinates that are assumed and that are specified, wherein
   in the specifying the relative position, the processor specifies multiple relative positions of each coordinates among multiple coordinates that are included in the last item of drawing processing data and that demarcate the drawing area, with respect to coordinates that are included in the last item of input operation data;
   in the specifying the coordinate, the processor specifies multiple coordinates that are assumed to be included in the input operation data group, from coordinates of the drawing area corresponding to the one item of drawing processing data that is included in the drawing processing data group, based on the specified multiple relative positions; and
   in the associating different input operation data, the processor associates the different input operation data that is included in the input operation data group, with the one item of drawing processing data, based on at least any coordinates among the multiple coordinates that are assumed and that are specified.

2. The method of claim 1, wherein
   the relative position is a relative position of a coordinate that is included in the last item of drawing processing data with respect to a coordinate that is included in the last item of input operation data.

3. A non-transitory computer-readable medium including a program which causes the computer to execute a process, the process comprising:
   extracting an input operation data group that includes multiple items of input operation data and a drawing processing data group that includes multiple items of drawing processing data, each of the input operation data including coordinates in accordance with a screen operation in a remote desktop system, each of the drawing processing data including coordinates of an area on which drawing processing is performed in accordance with the screen operation, the screen operation being a screen operation during a predetermined period;
   specifying a relative position of a coordinate of a drawing area that is included in one item of drawing processing data among the extracted drawing processing data group, with respect to a coordinate that is included in one item of input operation data among the extracted input operation data group, the one item of input operation data being a last item of input operation data among a series of input operations of the extracted input operation data group during the predetermined period;
   specifying a coordinate that is assumed to be included in any item of input operation data which is included in the input operation data group, from a coordinate of a drawing area corresponding to one item of drawing processing data that is included in the drawing processing data group, based on the specified relative position, the one item of drawing processing data is the last item of drawing processing data during the predetermined period; and associating different input operation data that is included in the input operation data group, with the different drawing processing data, based on the coordinates that are assumed and that are specified, wherein in the specifying the relative position, specifying multiple relative positions of each coordinates among multiple coordinates that are included in the last item of drawing processing data and that demarcate the drawing area, with respect to coordinates that are included in the last item of input operation data, in the specifying the coordinates that are assumed, specifying multiple coordinates that are assumed to be included in the input operation data group, from coordinates of the drawing area corresponding to the different drawing processing data that is included in the drawing processing data group, based on the specified multiple relative positions, and in the associating different input operation data, associating the different input operation data that is included in the input operation data group, with the different drawing processing data, based on at least any coordinates among the multiple coordinates that are assumed and that are specified.

4. The non-transitory computer-readable medium according to claim 3, wherein the relative position is a relative position of a coordinate that is included in the last item of drawing processing data with respect to a coordinate that is included in the last item of input operation data.

5. An apparatus comprising:

a memory; and a processor coupled to the memory and configured to execute a process, the process comprising:

extracting an input operation data group that includes multiple items of input operation data and a drawing processing data group that includes multiple items of drawing processing data, each of the input operation data including coordinates in accordance with a screen operation in a remote desktop system, each of the drawing processing data including coordinates of an area on which drawing processing is performed in accordance with the screen operation, the screen operation being a screen operation during a predetermined period;

specifying a relative position of a coordinate of a drawing area that is included in one item of drawing processing data among the extracted drawing processing data group, with respect to a coordinate that is included in one item of input operation data among the extracted input operation data group, the one item of input operation data being a last item of input operation data among a series of input operations of the extracted input operation data group during the predetermined period;

specifying a coordinate that is assumed to be included in any item of input operation data which is included in the input operation data group, from a coordinate of a drawing area corresponding to one item of drawing processing data that is included in the drawing processing data group, based on the specified relative position, the one item of drawing processing data is the last item of drawing processing data during the predetermined period; and associating different input operation data that is included in the input operation data group, with the different drawing processing data, based on the coordinates that are assumed and that are specified, wherein in the specifying the relative position, specifying multiple relative positions of each coordinates among multiple coordinates that are included in the last item of drawing processing data and that demarcate the drawing area, with respect to coordinates that are included in the last item of input operation data, in the specifying the coordinates that are assumed, specifying multiple coordinates that are assumed to be included in the input operation data group, from coordinates of the drawing area corresponding to the different drawing processing data that is included in the drawing processing data group, based on the specified multiple relative positions, and in the associating different input operation data, associating the different input operation data that is included in the input operation data group, with the different drawing processing data, based on at least any coordinates among the multiple coordinates that are assumed and that are specified.

6. The apparatus according to claim 5, wherein the relative position is a relative position of a coordinate that is included in the last item of drawing processing data with respect to a coordinate that is included in the last item of input operation data.

* * * * *